US012563481B2

(12) United States Patent
Hong et al.

(10) Patent No.: US 12,563,481 B2
(45) Date of Patent: Feb. 24, 2026

(54) METHOD OF TRANSMITTING AND RECEIVING PRIMARY SYNCHRONIZATION SIGNAL AND APPARATUS THEREOF

(71) Applicant: LG Electronics Inc., Seoul (KR)

(72) Inventors: Taehowan Hong, Seoul (KR); Kijun Kim, Seoul (KR); Dongsun Lee, Seoul (KR); Jongku Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 429 days.

(21) Appl. No.: 18/100,047

(22) Filed: Jan. 23, 2023

(65) Prior Publication Data

US 2024/0073793 A1 Feb. 29, 2024

(30) Foreign Application Priority Data

Aug. 19, 2022 (KR) ........................ 10-2022-0103874

(51) Int. Cl.
H04W 48/16 (2009.01)
H04L 5/00 (2006.01)
(52) U.S. Cl.
CPC ........... H04W 48/16 (2013.01); H04L 5/0048 (2013.01)
(58) Field of Classification Search
CPC ................. H04W 48/16; H04L 5/0048; H04L 27/26526; H04L 27/2663; H04L 27/2678; H04J 11/0073
See application file for complete search history.

(56) References Cited

U.S. PATENT DOCUMENTS

| | | | |
|---|---|---|---|
| 2016/0270015 A1 | 9/2016 | Lin et al. | |
| 2017/0223648 A1* | 8/2017 | Shin .................... | H04W 56/005 |
| 2018/0278455 A1 | 9/2018 | Reial et al. | |
| 2019/0028224 A1 | 1/2019 | Kim et al. | |
| 2020/0015177 A1 | 1/2020 | Kim et al. | |
| 2021/0058878 A1 | 2/2021 | Kwon et al. | |

OTHER PUBLICATIONS

Office Action in Japanese Appln. No. 2023-079958, mailed on May 28, 2024, 12 pages (with English translation).
Office Action in Korean Appln. No. 10-2022-0103874, mailed on Feb. 3, 2025, 9 pages (with English translation).

* cited by examiner

*Primary Examiner* — Diane D Mizrahi
(74) *Attorney, Agent, or Firm* — Fish & Richardson P.C.

(57) ABSTRACT

Provided is a method performed by a user equipment (UE) in a wireless communication system including receiving a downlink signal, filtering the downlink signal, sampling the filtered downlink signal, performing differential decoding on the sampled downlink signal, obtaining a primary synchronization signal (PSS) sequence based on the downlink signal on which the differential decoding is performed, and obtaining cell area information based on the PSS sequence obtained based on the downlink signal on which the differential decoding is performed.

13 Claims, 28 Drawing Sheets

FIG. 4

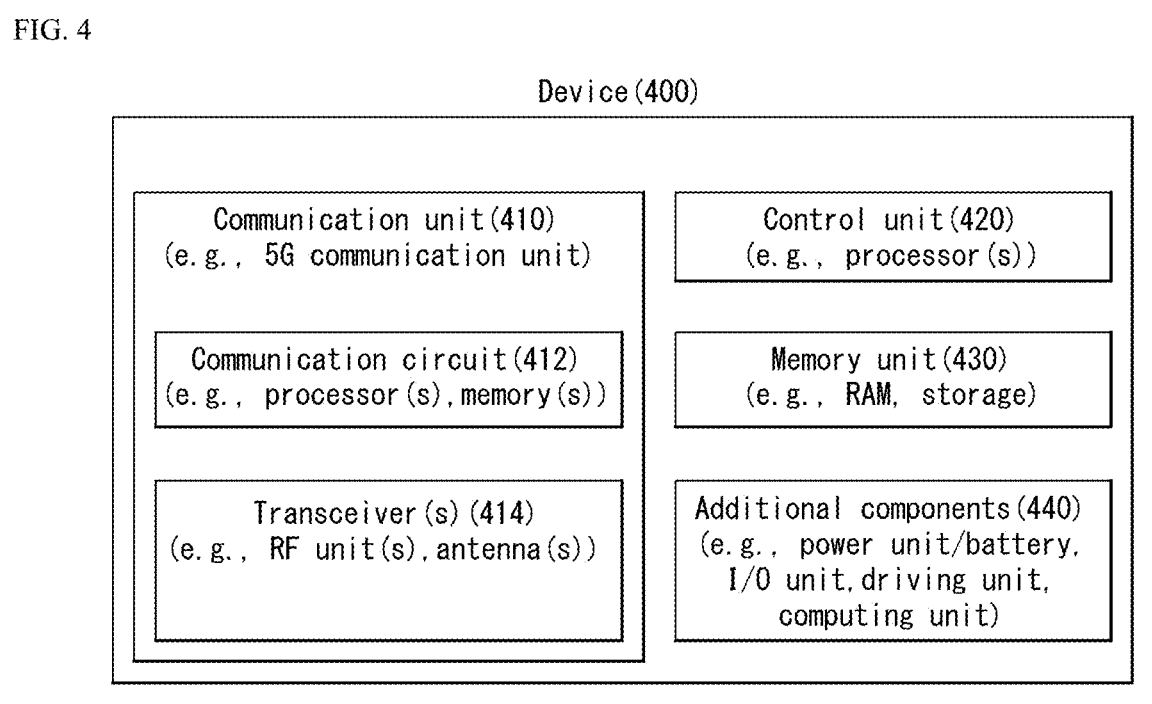

Device(400)

```
Communication unit(410)
(e.g., 5G communication unit)

Communication circuit(412)
    (e.g., processor(s),memory(s))

Transceiver(s)(414)
    (e.g., RF unit(s),antenna(s))

Control unit(420)
(e.g., processor(s))

Memory unit(430)
(e.g., RAM, storage)

Additional components(440)
(e.g., power unit/battery,
I/O unit,driving unit,
computing unit)
```

FIG. 6

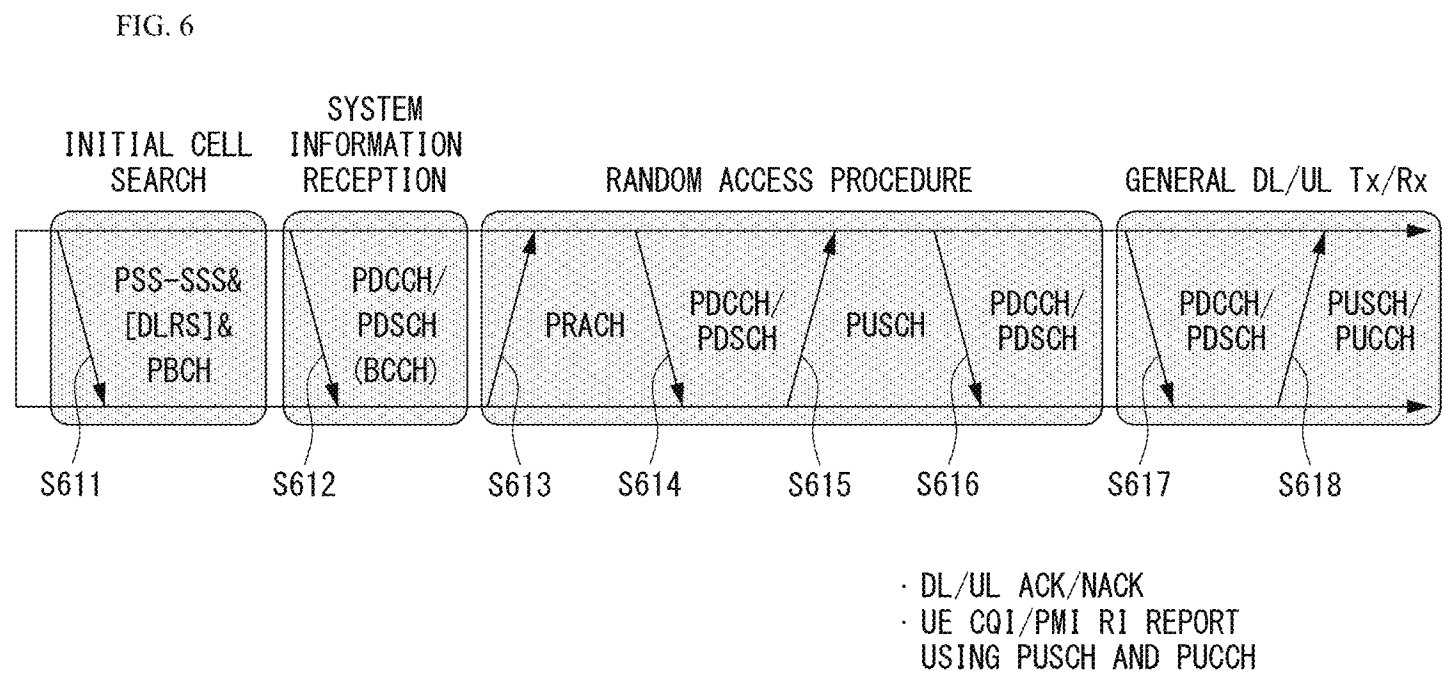

INITIAL CELL SEARCH

SYSTEM INFORMATION RECEPTION

RANDOM ACCESS PROCEDURE

GENERAL DL/UL Tx/Rx

PSS-SSS& [DLRS]& PBCH

S611

PDCCH/ PDSCH (BCCH)

S612

PRACH

S613

PDCCH/ PDSCH

S614

PUSCH

S615

PDCCH/ PDSCH

S616

PDCCH/ PDSCH

S617

PUSCH/ PUCCH

S618

· DL/UL ACK/NACK
· UE CQI/PMI RI REPORT USING PUSCH AND PUCCH

THz SMALL CELLS

THz DATA
CENTRE
NETWORK

THz
BACKHAUL
LINK

BACKHAUL
COMMUNICATION

VEHICLUAR
COMMUNICATION

THz KIOSK
DOWNLOADING

Phase noise PSD as of TR 38.803, Sections 6.1.10-11

1020

2000

Simulation Parameters

- SCS:240 kHz
- Carrier frequency: 150 GHz
- IFFT size: 1024
- DFT size: 128
- Phase noise model: 3GPP multi pole zero Probability of PSS detection
(Carrier frequency: 350 GHz)

Conventional PSS
PN cancellation PSS

SNR [dB]

Simulation Parameters

• SCS:240 kHz
• Carrier frequency: 350 GHz
• IFFT size: 1024
• DFT size: 128
• Phase noise model: 3GPP multi pole zero Differential PSS detection

METHOD OF TRANSMITTING AND RECEIVING PRIMARY SYNCHRONIZATION SIGNAL AND APPARATUS THEREOF

CROSS-REFERENCE TO RELATED APPLICATIONS

This application claims the priority of Korean Application No. 10-2022-0103874, filed on Aug. 19, 2022, the contents of which are all hereby incorporated by reference herein in its entirety.

BACKGROUND

Field

The present disclosure relates to a method and apparatus for transmitting and receiving a primary synchronization signal (PSS), and more particularly, to a method and apparatus for transmitting and receiving PSS that minimizes the effect of phase noise.

Related Art

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

Meanwhile, in 5G NR, discrete Fourier transform spread orthogonal frequency division multiplexing (DFT-s-OFDM) is applied to uplink and OFDM is applied to downlink. When OFDM is applied to downlink in a high frequency band such as a terahertz band, there is a problem in that a peak-to-average power ratio (PAPR) value may increase. In order to solve this problem, application of DFT-s-OFDM to downlink in a terahertz band communication system has been discussed.

SUMMARY

The present disclosure provides a method and apparatus for transmitting and receiving primary synchronization signal (PSS).

The present disclosure also provides a method and apparatus for transmitting and receiving a PSS having a high probability of PSS detection in a high frequency band.

The present disclosure also provides a method and apparatus for transmitting and receiving a PSS having a high probability of PSS detection even when a signal-to-noise ratio (SNR) value is less than a certain value in a high frequency band.

Technical objects to be achieved by the present disclosure are not limited to the aforementioned technical objects, and other technical objects not described above may be evidently understood by a person having ordinary skill in the art to which the present disclosure pertains from the following description.

In an aspect, a method performed by a user equipment (UE) in a wireless communication system includes: receiving a downlink signal; filtering the downlink signal; sampling the filtered downlink signal; performing differential decoding on the sampled downlink signal; obtaining a primary synchronization signal (PSS) sequence based on the downlink signal on which the differential decoding is performed; and obtaining cell area information based on the PSS sequence obtained based on the downlink signal on which the differential decoding is performed.

The obtaining of the PSS sequence may include: generating a reference signal (RS); and obtaining the PSS sequence based on correlation between the downlink signal on which the differential decoding is performed and the RS.

The generating of the RS may include: generating a PSS sequence at a time sample before a time sample at which the PSS sequence is generated; performing discrete Fourier transform (DFT) on the generated PSS sequence; mapping a resource to the PSS sequence on which the DFT is performed; and performing inverse DFT (IDFT) on the resource to which the PSS sequence is mapped.

The method may further include: obtaining a PSS sequence based on the sampled downlink signal; and obtaining cell area information based on the PSS sequence obtained based on the sampled downlink signal.

The obtaining of the PSS sequence based on the sampled downlink signal may include: generating an RS; and obtaining the PSS sequence based on correlation between the downlink signal on which the differential decoding is performed and the RS.

The generating of the RS may include: generating a PSS sequence at a time sample before a time sample at which the PSS sequence is generated; performing differential encoding on the generated PSS sequence; performing DFT on the PSS sequence on the differential encoding is performed; mapping a resource to the PSS sequence on which the DFT is performed; and performing IDFT on the resource to which the PSS sequence is mapped.

In another aspect, a user equipment (UE) operating in a wireless communication system includes: one or more transceivers; one or more processors configured to control the one or more transceivers; and a memory including one or more instructions to be executed by the one or more processors, wherein the one or more instructions include: receiving a downlink signal; filtering the downlink signal; sampling the filtered downlink signal; performing differential decoding on the sampled downlink signal; obtaining a primary synchronization signal (PSS) sequence based on the downlink signal on which the differential decoding is performed; and obtaining cell area information based on the PSS sequence obtained based on the downlink signal on which the differential decoding is performed.

The obtaining of the PSS sequence may include: generating a reference signal (RS); and obtaining the PSS sequence based on correlation between the downlink signal on which the differential decoding is performed and the RS.

The generating of the RS may include: generating a PSS sequence at a time sample before a time sample at which the PSS sequence is generated; performing discrete Fourier transform (DFT) on the generated PSS sequence; mapping a resource to the PSS sequence on which the DFT is performed; and performing inverse DFT (IDFT) on the resource to which the PSS sequence is mapped.

The UE may further include: obtaining a PSS sequence based on the sampled downlink signal; and obtaining cell area information based on the PSS sequence obtained based on the sampled downlink signal.

The obtaining of the PSS sequence based on the sampled downlink signal may include: generating an RS; and obtaining the PSS sequence based on correlation between the downlink signal on which the differential decoding is performed and the RS.

The generating of the RS may include: generating a PSS sequence at a time sample before a time sample at which the PSS sequence is generated; performing differential encoding on the generated PSS sequence; performing DFT on the PSS sequence on the differential encoding is performed; mapping a resource to the PSS sequence on which the DFT is performed; and performing IDFT on the resource to which the PSS sequence is mapped.

In another aspect, a method performed by a base station (BS) operating in a wireless communication system includes: generating a primary synchronization signal (PSS) sequence based on cell area information; performing differential encoding on the PSS sequence; performing discrete Fourier transform (DFT) on the PSS sequence on which the differential encoding is performed; mapping a resource to the PSS sequence on which the DFT is performed; generating a discrete Fourier transform spread orthogonal frequency division multiplexing (DFT-s-OFDM) symbol based on the resource to which the PSS sequence is mapped; and generating a downlink signal by adding a cyclic prefix (CP) to the DFT-s-OFDM symbol.

In another aspect, a base station (BS) operating in a wireless communication system includes: one or more transceivers; one or more processors configured to control the one or more transceivers; and a memory including one or more instructions to be executed by the one or more processors, wherein the one or more instructions include: generating a primary synchronization signal (PSS) sequence based on cell area information; performing differential encoding on the PSS sequence; performing discrete Fourier transform (DFT) on the PSS sequence on which the differential encoding is performed; mapping a resource to the PSS sequence on which the DFT is performed; generating a discrete Fourier transform spread orthogonal frequency division multiplexing (DFT-s-OFDM) symbol based on the resource to which the PSS sequence is mapped; and generating a downlink signal by adding a cyclic prefix (CP) to the DFT-s-OFDM symbol.

In another aspect, a device includes one or more memories and one or more processors functionally connected to the one or more memories, wherein the one or more processors are configured so that the device receives a downlink signal, filters the downlink signal, samples the filtered downlink signal, performs differential decoding on the sampled downlink signal, obtains a primary synchronization signal (PSS) sequence based on the downlink signal on which the differential decoding is performed, and obtains cell area information based on the PSS sequence obtained based on the downlink signal on which the differential decoding is performed.

In another aspect, a computer-readable medium, as one or more non-transitory computer-readable mediums storing one or more instructions, operates to receive a downlink signal, filter the downlink signal, sample the filtered downlink signal, perform differential decoding on the sampled downlink signal, obtain a primary synchronization signal (PSS) sequence based on the downlink signal on which the differential decoding is performed, and obtain cell area information based on the PSS sequence obtained based on the downlink signal on which the differential decoding is performed.

According to an embodiment of the present disclosure, a probability of PSS detection in a high frequency band may increase by removing radio frequency (RF) impairment phase noise.

According to an embodiment of the present disclosure, by obtaining a PSS sequence based on correlation, the probability of PSS detection in a high frequency band may increase even if a signal-to-noise ratio (SNR) value is less than a certain value, The effects obtainable in the present disclosure are not limited to the effects mentioned above, and other effects not mentioned will be clearly understood by those skilled in the art from the description below.

BRIEF DESCRIPTION OF THE DRAWINGS

The accompany drawings, which are included to provide a further understanding of the present disclosure and are incorporated on and constitute a part of the present disclosure illustrate embodiments of the present disclosure and together with the description serve to explain the principles of the present disclosure.

FIG. 4 is a view showing another example of a wireless device applicable to the present disclosure.

FIG. 6 is a view showing physical channels applicable to the present disclosure and a signal transmission method using the same.

DESCRIPTION OF EXEMPLARY EMBODIMENTS

Figure 1:
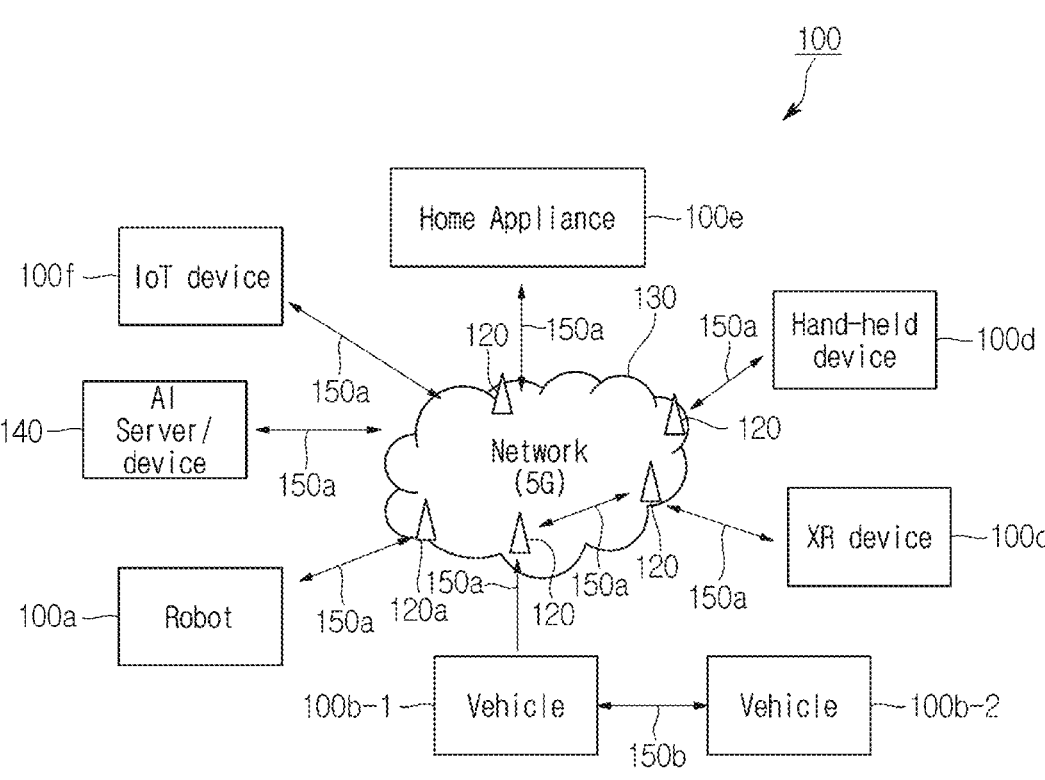
FIG. 1 is a view showing an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an UpLink (UL). Likewise, the mobile station may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5th generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 is a view showing an example of a communication system applicable to the present disclosure.

Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include an unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120 and the network 130 may be implemented by a wireless device, and a specific wireless device 120a may operate as a base station/network node for another wireless device.

The wireless devices 100a to 100f may be connected to the network 130 through the base station 120. AI technology is applicable to the wireless devices 100a to 100f, and the wireless devices 100a to 100f may be connected to the AI server 100g through the network 130. The network 130 may be configured using a 3G network, a 4G (e.g., LTE) network or a 5G (e.g., NR) network, etc. The wireless devices 100a to 100f may communicate with each other through the base station 120/the network 130 or perform direct communication (e.g., sidelink communication) without through the base station 120/the network 130. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base station 120 and the base station 120/the base station 120. Here, wireless communication/connection may be established through various radio access technologies (e.g., 5G NR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/from each other through wireless communication/connection 150a, 150b and 150c. For example, wireless communication/connection 150a, 150b and 150c may enable signal-transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Communication System Applicable to the Present Disclosure

Figure 2:
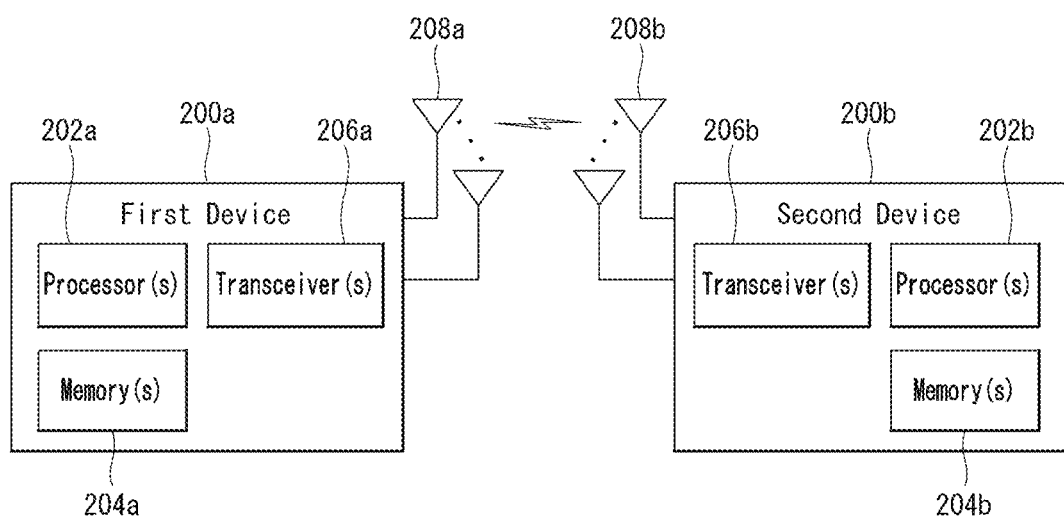
FIG. 2 is a view showing an example of a wireless apparatus applicable to the present disclosure.

FIG. 2 is a view showing an example of a wireless device applicable to the present disclosure.

Referring to FIG. 2, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be connected with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be connected with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may include one or more processors 202b and one or more memories 204b and may further include one or more transceivers 206b and/or one or more antennas 208b. The processor 202b may be configured to control the memory 204b and/or the transceiver 206b and to implement the descriptions, functions, procedures, proposals, methods and/or operational flowcharts disclosed herein. For example, the processor 202b may process information in the memory 204b to generate third information/signal and then transmit the third information/signal through the transceiver 206b. In addition, the processor 202b may receive a radio signal including fourth information/signal through the transceiver 206b and then store information obtained from signal processing of the fourth information/signal in the memory 204b. The memory 204b may be connected with the processor 202b to store a variety of information related to operation of the processor 202b. For example, the memory 204b may store software code including instructions for performing all or some of the processes controlled by the processor 202b or performing the descriptions, functions, procedures, proposals, methods and/or operational flowcharts disclosed herein. Herein, the processor 202b and the memory 204b may be part of a communication modem/circuit/chip designed to implement wireless communication technology (e.g., LTE or NR). The transceiver 206b may be connected with the processor 202b to transmit and/or receive radio signals through one or more antennas 208b. The transceiver 206b may include a transmitter and/or a receiver. The transceiver 206b may be used interchangeably with a radio frequency (RF) unit. In the present disclosure, the wireless device may refer to a communication modem/circuit/chip.

Hereinafter, hardware elements of the wireless devices 200a and 200b will be described in greater detail. Without being limited thereto, one or more protocol layers may be implemented by one or more processors 202a and 202b. For example, one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202a and 202b may generate one or more protocol data units (PDUs) and/or one or more service data unit (SDU) according to the descriptions, functions, procedures, proposals, methods and/or operational flowcharts disclosed herein. One or more processors 202a and 202b may generate messages, control information, data or information according to the descriptions, functions, procedures, proposals, methods and/or operational flowcharts disclosed herein. One or more processors 202a and 202b may generate PDUs, SDUs, messages, control information, data or information according to the functions, procedures, proposals and/or methods disclosed herein and provide the PDUs, SDUs, messages, control information, data or information to one or more transceivers 206a and 206b. One or more processors 202a and 202b may receive signals (e.g., baseband signals) from one or more transceivers 206a and 206b and acquire PDUs, SDUs, messages, control information, data or information according to the descriptions, functions, procedures, proposals, methods and/or operational flowcharts disclosed herein.

One or more processors 202a and 202b may be referred to as controllers, microcontrollers, microprocessors or microcomputers. One or more processors 202a and 202b may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202a and 202b. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202a and 202b or stored in one or more memories 204a and 204b to be driven by one or more processors 202a and 202b. The descriptions, functions, procedures, proposals, methods and/or operational flowcharts disclosed herein implemented using firmware or software in the form of code, a command and/or a set of commands.

One or more memories 204a and 204b may be connected with one or more processors 202a and 202b to store various types of data, signals, messages, information, programs, code, instructions and/or commands. One or more memories 204a and 204b may be composed of read only memories (ROMs), random access memories (RAMs), erasable programmable read only memories (EPROMs), flash memories, hard drives, registers, cache memories, computer-readable storage mediums and/or combinations thereof. One or more memories 204a and 204b may be located inside and/or outside one or more processors 202a and 202b. In addition, one or more memories 204a and 204b may be connected with one or more processors 202a and 202b through various technologies such as wired or wireless connection.

One or more transceivers 206a and 206b may transmit user data, control information, radio signals/channels, etc. described in the methods and/or operational flowcharts of the present disclosure to one or more other apparatuses. One or more transceivers 206a and 206b may receive user data, control information, radio signals/channels, etc. described in the methods and/or operational flowcharts of the present disclosure from one or more other apparatuses. For example, one or more transceivers 206a and 206b may be connected with one or more processors 202a and 202b to transmit/receive radio signals. For example, one or more processors 202a and 202b may perform control such that one or more transceivers 206a and 206b transmit user data, control information or radio signals to one or more other apparatuses.

In addition, one or more processors 202a and 202b may perform control such that one or more transceivers 206a and 206b receive user data, control information or radio signals from one or more other apparatuses. In addition, one or more transceivers 206a and 206b may be connected with one or more antennas 208a and 208b, and one or more transceivers 206a and 206b may be configured to transmit/receive user data, control information, radio signals/channels, etc. described in the descriptions, functions, procedures, proposals, methods and/or operational flowcharts disclosed herein through one or more antennas 208a and 208b. In the present disclosure, one or more antennas may be a plurality of physical antennas or a plurality of logical antennas (e.g., antenna ports). One or more transceivers 206a and 206b may convert the received radio signals/channels, etc. from RF band signals to baseband signals, in order to process the received user data, control information, radio signals/channels, etc. using one or more processors 202a and 202b. One or more transceivers 206a and 206b may convert the user data, control information, radio signals/channels processed using one or more processors 202a and 202b from baseband signals into RF band signals. To this end, one or more transceivers 206a and 206b may include (analog) oscillator and/or filters.

Figure 3:
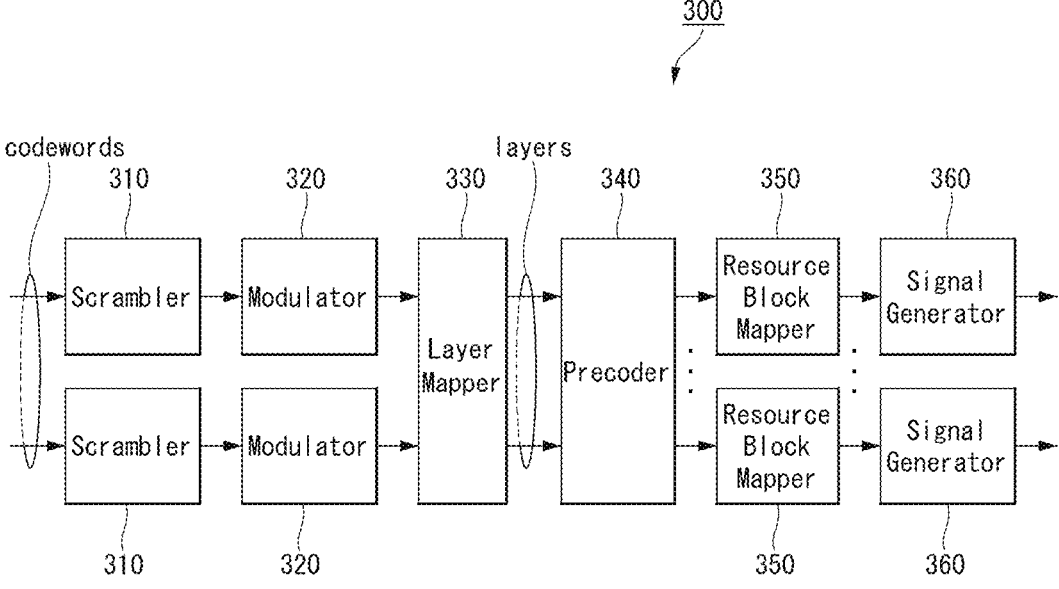
FIG. 3 is a view showing a method of processing a transmitted signal applicable to the present disclosure.

FIG. 3 is a view showing a method of processing a transmitted signal applicable to the present disclosure. For example, the transmitted signal may be processed by a signal processing circuit. At this time, a signal processing circuit 300 may include a scrambler 310, a modulator 320, a layer mapper 330, a precoder 340, a resource mapper 350, and a signal generator 360. At this time, for example, the operation/function of FIG. 3 may be performed by the processors 202a and 202b and/or the transceiver 206a and 206b of FIG. 2. In addition, for example, the hardware element of FIG. 3 may be implemented in the processors 202a and 202b of FIG. 2 and/or the transceivers 206a and 206b of FIG. 2. For example, blocks 1010 to 1060 may be implemented in the processors 202a and 202b of FIG. 2. In addition, blocks 310 to 350 may be implemented in the processors 202a and 202b of FIG. 2 and a block 360 may be implemented in the transceivers 206a and 206b of FIG. 2, without being limited to the above-described embodiments.

A codeword may be converted into a radio signal through the signal processing circuit 300 of FIG. 3. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 6. Specifically, the codeword may be converted into a bit sequence scrambled by the scrambler 310. The scramble sequence used for scramble is generated based in an initial value and the initial value may include ID information of a wireless device, etc. The scrambled bit sequence may be modulated into a modulated symbol sequence by the modulator 320. The modulation method may include pi/2-binary phase shift keying (pi/2-BPSK), m-phase shift keying (m-PSK), m-quadrature amplitude modulation (m-QAM), etc.

A complex modulation symbol sequence may be mapped to one or more transport layer by the layer mapper 330. Modulation symbols of each transport layer may be mapped to corresponding antenna port(s) by the precoder 340 (precoding). The output z of the precoder 340 may be obtained by multiplying the output y of the layer mapper 330 by an N*M precoding matrix W. Here, N may be the number of antenna ports and M may be the number of transport layers. Here, the precoder 340 may perform precoding after transform precoding (e.g., discrete Fourier transform (DFT)) for complex modulation symbols. In addition, the precoder 340 may perform precoding without performing transform precoding.

The resource mapper 350 may map modulation symbols of each antenna port to time . . . frequency resources. The time-frequency resources may include a plurality of symbols (e.g., a CP-OFDMA symbol and a DFT-s-OFDMA symbol) in the time domain and include a plurality of subcarriers in the frequency domain. The signal generator 360 may generate a radio signal from the mapped modulation symbols, and the generated radio signal may be transmitted to another device through each antenna. To this end, the signal generator 360 may include an inverse fast Fourier transform (IFFT) module, a cyclic prefix (CP) insertor, a digital-to-analog converter (DAC), a frequency uplink converter, etc.

A signal processing procedure for a received signal in the wireless device may be configured as the inverse of the signal processing procedures 310 to 360 of FIG. 3. For example, the wireless device (e.g., 200a or 200b of FIG. 2) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to a codeword through a resource de-mapper process, a postcoding process, a demodulation process and a de-scrambling process. The codeword may be restored to an original information block through decoding. Accordingly, a signal processing circuit (not shown) for a received signal may include a signal restorer, a resource de-mapper, a postcoder, a demodulator, a de-scrambler and a decoder.

Structure of Wireless Device Applicable to the Present Disclosure

FIG. 4 is a view showing another example of a wireless device applicable to the present disclosure.

Referring to FIG. 4, a wireless device 400 may correspond to the wireless devices 200a and 200b of FIG. 2 and include various elements, components, units/portions and/or modules. For example, the wireless device 300 may include a communication unit 410, a control unit (controller) 420, a memory unit (memory) 430 and additional components 440. The communication unit may include a communication circuit 412 and a transceiver(s) 414. For example, the communication circuit 412 may include one or more processors 202a and 202b and/or one or more memories 204a and 204b of FIG. 2. For example, the transceiver(s) 414 may include one or more transceivers 206a and 206b and/or one or more antennas 208a and 208b of FIG. 2. The control unit 420 may be electrically connected with the communication unit 410, the memory unit 430 and the additional components 440 to control overall operation of the wireless device. For example, the control unit 420 may control electrical/mechanical operation of the wireless device based on a program/code/instruction/information stored in the memory unit 430. In addition, the control unit 420 may transmit the information stored in the memory unit 430 to the outside (e.g., another communication device) through the wireless/wired interface using the communication unit 410 over a wireless/wired interface or store information received from the outside (e.g., another communication device) through the wireless/wired interface using the communication unit 410 in the memory unit 430.

The additional components 440 may be variously configured according to the types of the wireless devices. For example, the additional components 440 may include at least one of a power unit/battery, an input/output unit, a driving unit or a computing unit. Without being limited thereto, the wireless device 300 may be implemented in the form of the robot (FIG. 1, 100a), the vehicles (FIGS. 1, 100b-1 and 100b-2), the XR device (FIG. 1, 100c), the hand-held device (FIG. 1, 100d), the home appliance (FIG. 1, 100e), the IoT device (FIG. 1, 100f), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 4, various elements, components, units/portions and/or modules in the wireless device 400 may be connected with each other through wired interfaces or at least some thereof may be wirelessly connected through the communication unit 410. For example, in the wireless device 400, the control unit 420 and the communication unit 410 may be connected by wire, and the control unit 420 and the first unit (e.g., 130 or 140) may be wirelessly connected through the communication unit 410. In addition, each element, component, unit/portion and/or module of the wireless device 400 may further include one or more elements. For example, the control unit 420 may be composed of a set of one or more processors. For example, the control unit 420 may be composed of a set of a communication control processor, an application processor, an electronic control unit (ECU), a graphic processing processor, a memory control processor, etc. In another example, the memory unit 430 may be composed of a random access memory (RAM), a dynamic RAM (DRAM), a read only memory (ROM), a flash memory, a volatile memory, a non-volatile memory and/or a combination thereof.

Hand-Held Device Applicable to the Present Disclosure

Figure 5:
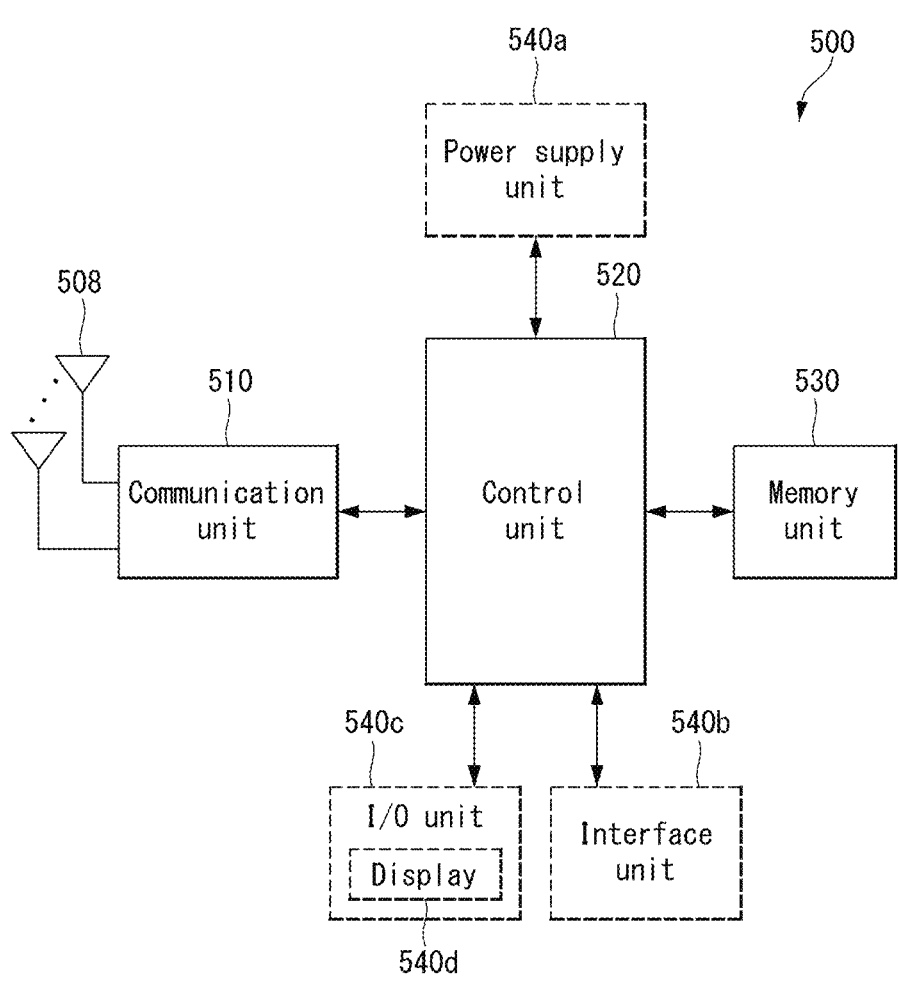
FIG. 5 is a view showing an example of a hand-held device applicable to the present disclosure.

FIG. 5 is a view showing an example of a hand-held device applicable to the present disclosure.

FIG. 5 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 5, the hand-held device 400 may include an antenna unit (antenna)

508, a communication unit (transceiver) 510, a control unit (controller) 520, a memory unit (memory) 530, a power supply unit (power supply) 540a, an interface unit (interface) 540b, and an input/output unit 540c. An antenna unit (antenna) 508 may be part of the communication unit 510. The blocks 510 to 530/540a to 540c may correspond to the blocks 410 to 430/440 of FIG. 4, respectively.

The communication unit 510 may transmit and receive signals (e.g., data, control signals, etc.) to and from other wireless devices or base stations. The control unit 520 may control the components of the hand-held device 500 to perform various operations. The control unit 520 may include an application processor (AP). The memory unit 530 may store data/parameters/program/code/instructions necessary to drive the hand-held device 400. In addition, the memory unit 530 may store input/output data/information, etc. The power supply unit 540a may supply power to the hand-held device 500 and include a wired/wireless charging circuit, a battery, etc. The interface unit 540b may support connection between the hand-held device 500 and another external device. The interface unit 540b may include various ports (e.g., an audio input/output port and a video input/output port) for connection with the external device. The input/output unit 540c may receive or output video information/signals, audio information/signals, data and/or user input information. The input/output unit 540c may include a camera, a microphone, a user input unit, a display 540d, a speaker and/or a haptic module.

For example, in case of data communication, the input/output unit 540c may acquire user input information/signal (e.g., touch, text, voice, image or video) from the user and store the user input information/signal in the memory unit 530. The communication unit 510 may convert the information/signal stored in the memory into a radio signal and transmit the converted radio signal to another wireless device directly or transmit the converted radio signal to a base station. In addition, the communication unit 510 may receive a radio signal from another wireless device or the base station and then restore the received radio signal into original information/signal. The restored information/signal may be stored in the memory unit 530 and then output through the input/output unit 540c in various forms (e.g., text, voice, image, video and haptic).

Physical Channels and General Signal Transmission

In a radio access system, a UE receives information from a base station on a DL and transmits information to the base station on a UL. The information transmitted and received between the UE and the base station includes general data information and a variety of control information. There are many physical channels according to the types/usages of information transmitted and received between the base station and the UE.

FIG. 6 is a view showing physical channels applicable to the present disclosure and a signal transmission method using the same.

The UE which is turned on again in a state of being turned off or has newly entered a cell performs initial cell search operation in step S611 such as acquisition of synchronization with a base station. Specifically, the UE performs synchronization with the base station, by receiving a Primary Synchronization Channel (P-SCH) and a Secondary Synchronization Channel (S-SCH) from the base station, and acquires information such as a cell Identifier (ID). Thereafter, the UE may receive a physical broadcast channel (PBCH) signal from the base station and acquire intra-cell broadcast information. Meanwhile, the UE may receive a downlink reference signal (DL RS) in an initial cell search step and check a downlink channel state. The UE which has completed initial cell search may receive a physical downlink control channel (PDCCH) and a physical downlink control channel (PDSCH) according to physical downlink control channel information in step S612, thereby acquiring more detailed system information.

Thereafter, the UE may perform a random access procedure such as steps S613 to S616 in order to complete access to the base station. To this end, the UE may transmit a preamble through a physical random access channel (PRACH) (S613) and receive a random access response (RAR) to the preamble through a physical downlink control channel and a physical downlink shared channel corresponding thereto (S614). The UE may transmit a physical uplink/shared channel (PUSCH) using scheduling information in the RAR (S615) and perform a contention resolution procedure such as reception of a physical downlink control channel signal and a physical downlink shared channel signal corresponding thereto (S616).

The UE, which has performed the above-described procedures, may perform reception of a physical downlink control channel signal and/or a physical downlink shared channel signal (S617) and transmission of a physical uplink shared channel (PUSCH) signal and/or a physical uplink control channel (PUCCH) signal (S618) as general uplink/downlink signal transmission procedures.

The control information transmitted from the UE to the base station is collectively referred to as uplink control information (UCI). The UCI includes hybrid automatic repeat and request acknowledgement/negative-ACK (HARQ-ACK/NACK), scheduling request (SR), channel quality indication (CQI), precoding matrix indication (PMI), rank indication (RI), beam indication (BI) information, etc. At this time, the UCI is generally periodically transmitted through a PUCCH, but may be transmitted through a PUSCH in some embodiments (e.g., when control information and traffic data are simultaneously transmitted). In addition, the UE may aperiodically transmit UCI through a PUSCH according to a request/instruction of a network.

Figure 7:
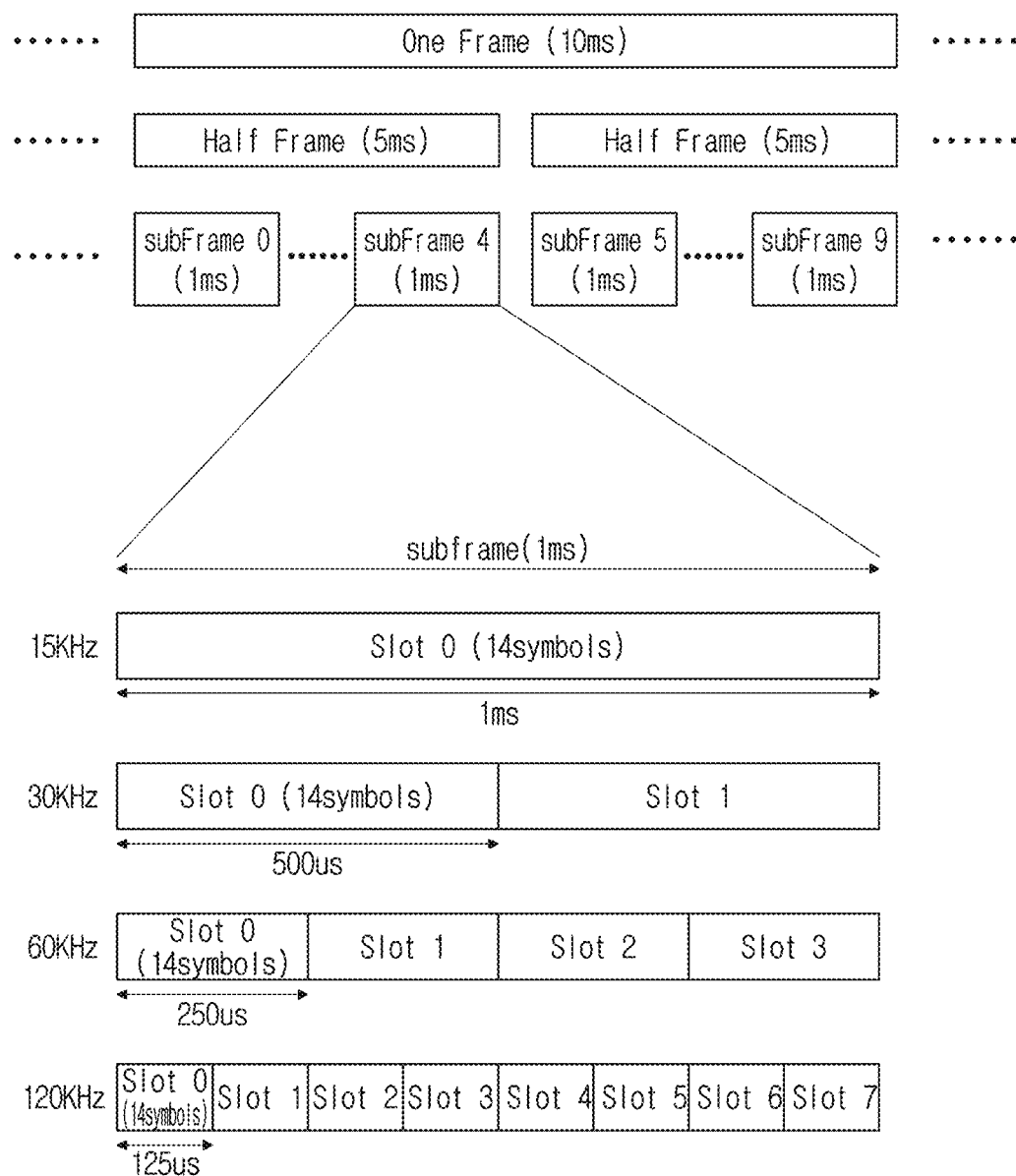
FIG. 7 is a view showing the structure of a radio frame applicable to the present disclosure.

FIG. 7 is a view showing the structure of a radio frame applicable to the present disclosure.

UL and DL transmission based on an NR system may be based on the frame shown in FIG. 7. At this time, one radio frame has a length of 10 ms and may be defined as two 5-ms half-frames (HFs). One half-frame may be defined as five 1-ms subframes (SFs). One subframe may be divided into one or more slots and the number of slots in the subframe may depend on subscriber spacing (SCS). At this time, each slot may include 12 or 14 OFDM (A) symbols according to cyclic prefix (CP). If normal CP is used, each slot may include 14 symbols. If an extended CP is used, each slot may include 12 symbols. Here, the symbol may include an OFDM symbol (or a CP-OFDM symbol) and an SC-FDMA symbol (or a DFT-s-OFDM symbol).

Table 1 shows the number of symbols per slot according to SCS, the number of slots per frame and the number of slots per subframe when normal CP is used, and Table 2 shows the number of symbols per slot according to SCS, the number of slots per frame and the number of slots per subframe when extended CP is used.

TABLE 1

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

In Tables 1 and 2 above, $N_{slot}^{symb}$ may indicate the number of symbols in a slot, $N_{slot}^{frame, \mu}$ slot may indicate the number of slots in a frame, and $N_{slot}^{subframe, \mu}$ may indicate the number of slots in a subframe.

In addition, in a system, to which the present disclosure is applicable, OFDM (A) numerology (e.g., SCS, CP length, etc.) may be differently set among a plurality of cells merged to one UE. Accordingly, an (absolute time) period of a time resource (e.g., an SF, a slot or a TTI) (for convenience, collectively referred to as a time unit (TU)) composed of the same number of symbols may be differently set between merged cells.

NR may support a plurality of numerologies (or subscriber spacings (SCSs)) supporting various 5G services. For example, a wide area in traditional cellular bands is supported when the SCS is 15 kHz, dense-urban, lower latency and wider carrier bandwidth are supported when the SCS is 30 kHz/60 kHz, and bandwidth greater than 24.25 GHz may be supported to overcome phase noise when the SCS is 60 kHz or higher.

An NR frequency band is defined as two types (FR1 and FR2) of frequency ranges. FR1 and FR2 may be configured as shown in the following table. In addition, FR2 may mean millimeter wave (mmW).

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In addition, for example, in a communication system, to which the present disclosure is applicable, the above-described numerology may be differently set. For example, a terahertz wave (THz) band may be used as a frequency band higher than FR2. In the THz band, the SCS may be set greater than that of the NR system, and the number of slots may be differently set, without being limited to the above-described embodiments. The THz band will be described below.

Figure 8:
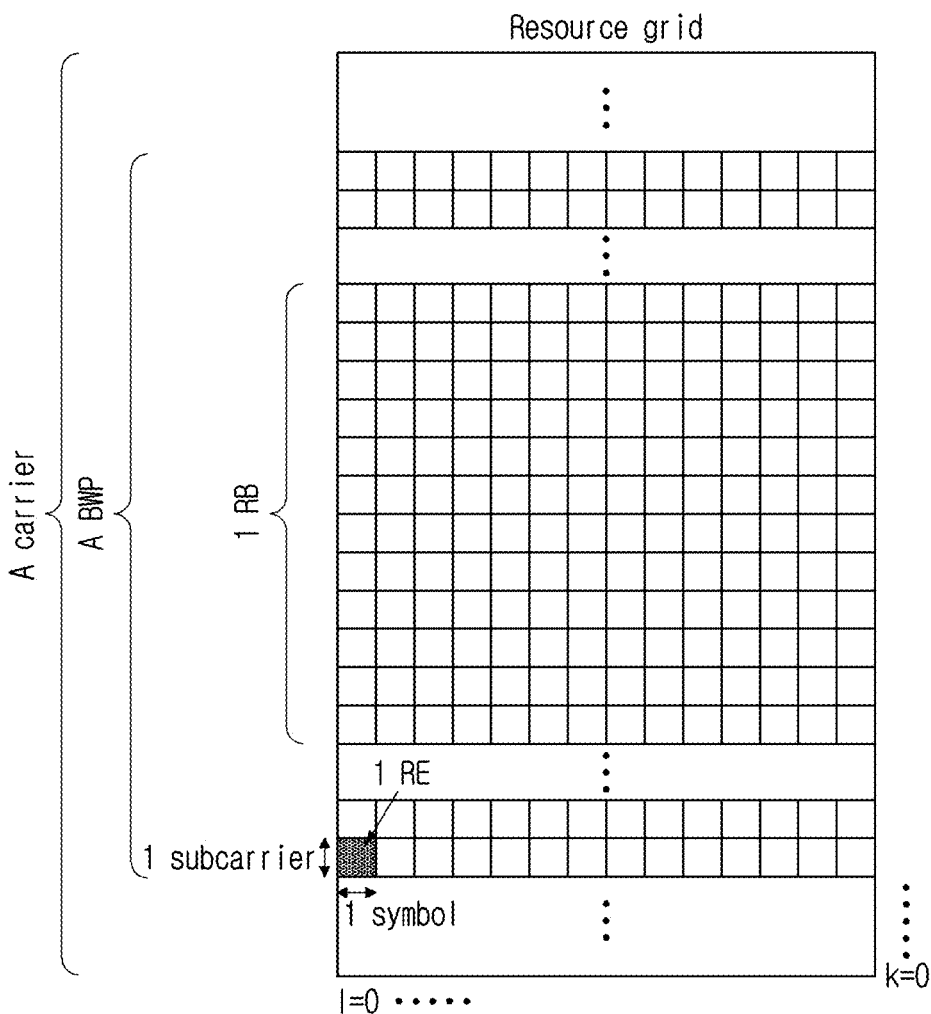
FIG. 8 is a view showing a slot structure applicable to the present disclosure.

FIG. 8 is a view showing a slot structure applicable to the present disclosure.

One slot includes a plurality of symbols in the time domain. For example, one slot includes seven symbols in case of normal CP and one slot includes six symbols in case of extended CP. A carrier includes a plurality of subcarriers in the frequency domain. A resource block (RB) may be defined as a plurality (e.g., 12) of consecutive subcarriers in the frequency domain.

In addition, a bandwidth part (BWP) is defined as a plurality of consecutive (P) RBs in the frequency domain and may correspond to one numerology (e.g., SCS, CP length, etc.).

The carrier may include a maximum of N (e.g., five) BWPs. Data communication is performed through an activated BWP and only one BWP may be activated for one UE. In resource grid, each element is referred to as a resource element (RE) and one complex symbol may be mapped 6G Communication System A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 4 shows the requirements of the 6G system.

TABLE 4

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 9:
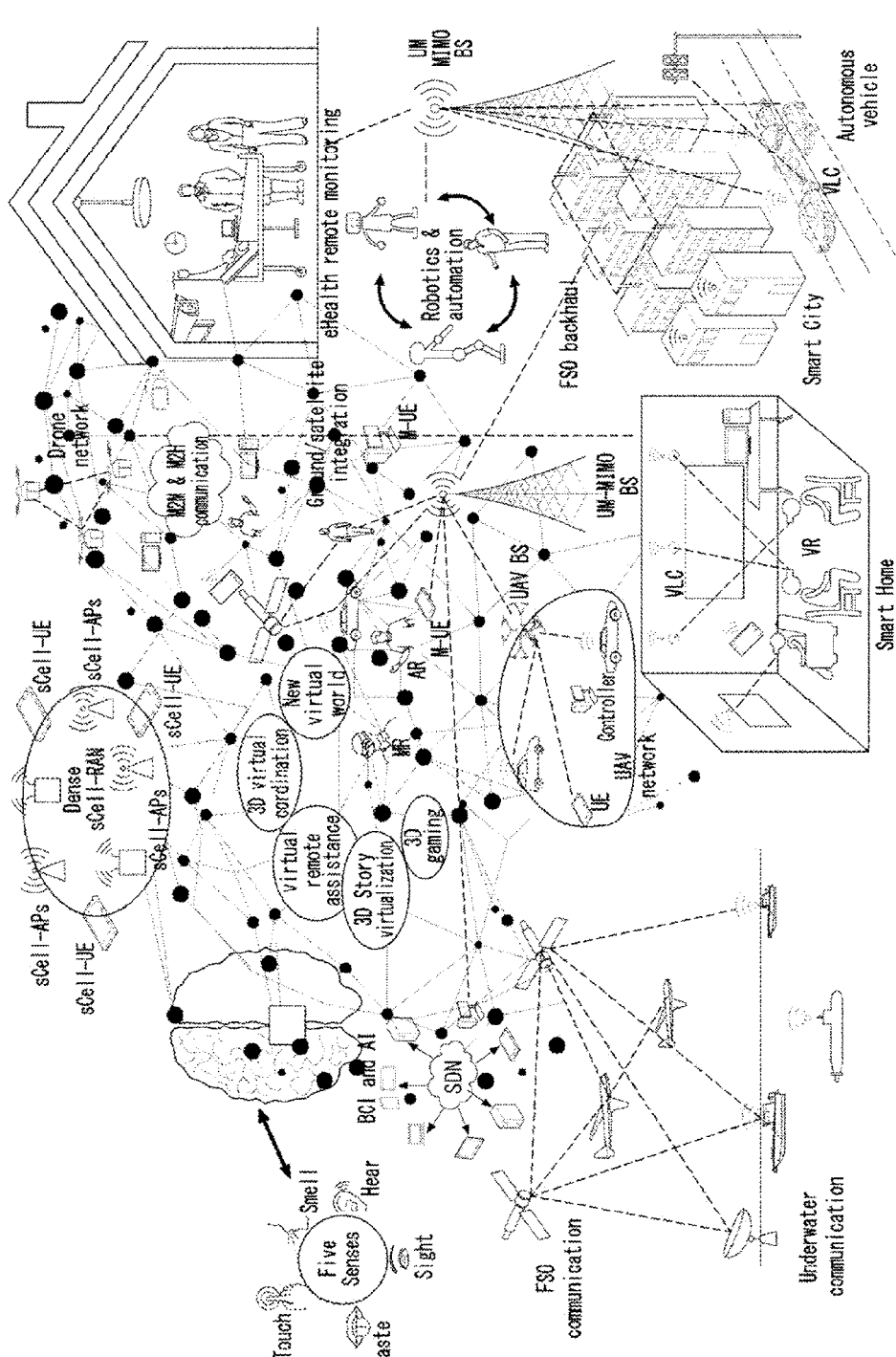
FIG. 9 is a view showing an example of a communication structure providable in a 6G system applicable to the present disclosure.

FIG. 9 is a view showing an example of a communication structure providable in a 6G system applicable to the present disclosure.

Referring to FIG. 9, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimension connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduce costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

Core Implementation Technology of 6G System

Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

Terahertz (THz) Communication

THz communication is applicable to the 6G system. For example, a data rate may increase by increasing bandwidth. This may be performed by using sub-TH communication with wide bandwidth and applying advanced massive MIMO technology.

Figure 10:
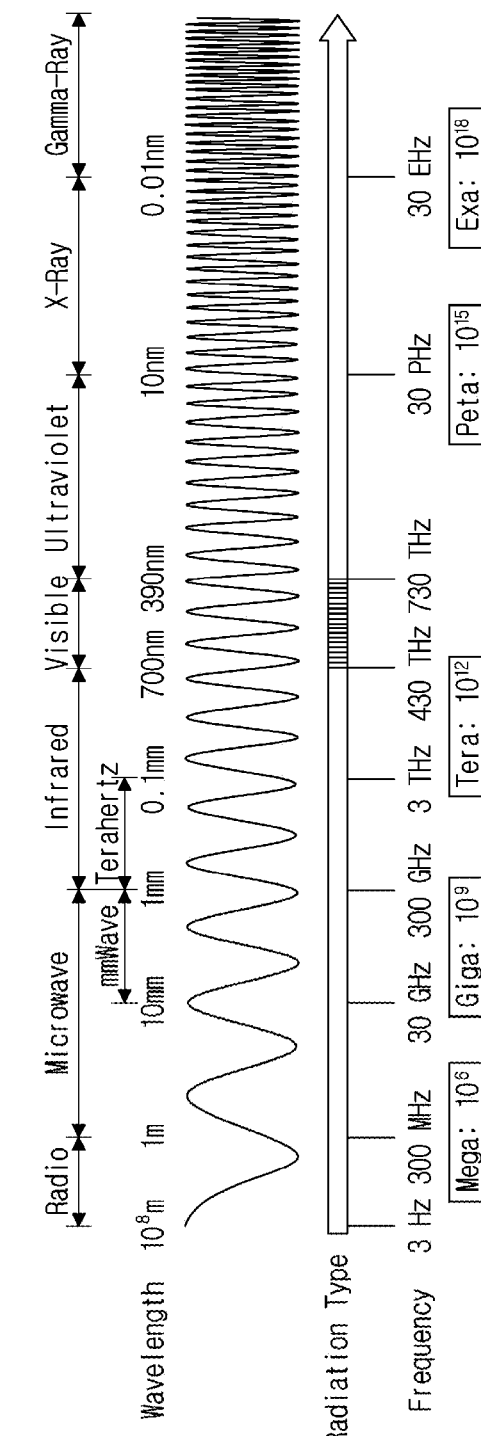
FIG. 10 is a view showing an electromagnetic spectrum applicable to the present disclosure.

FIG. 10 is a view showing an electromagnetic spectrum applicable to the present disclosure. For example, referring to FIG. 10, THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Massive MIMO Technology

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Blockchain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

3D Networking

The 6G system integrates terrestrial and public networks to support vertical expansion of user communication. A 3D BS will be provided through low-orbit satellites and UAVs. Adding new dimensions in terms of altitude and related degrees of freedom makes 3D connections significantly different from existing 2D networks.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Unmanned Aerial Vehicle

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Wireless Information and Energy Transfer (WIET)

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connection such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

THz Wireless Communication

Figure 11:
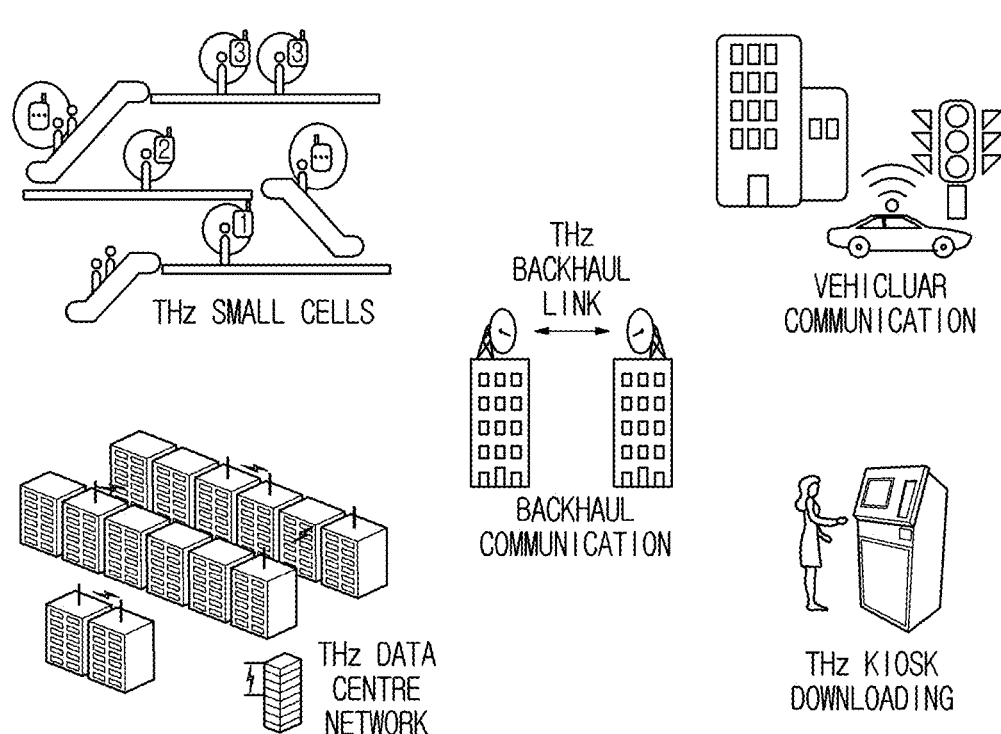
FIG. 11 is a view showing a THz communication method applicable to the present disclosure.

FIG. 11 is a view showing a THz communication method applicable to the present disclosure.

Referring to FIG. 11, THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence.

In addition, the photon energy of the THz wave is only a few meV and thus is harmless to the human body. A frequency band which will be used for THz wireless communication may be a D-band (110 GHz to 170 GHz) or a H-band (220 GHz to 325 GHZ) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

Specifically, referring to FIG. 11, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multipoint connection such as wireless connection in a data center or kiosk downloading. Table 5 below shows an example of technology which may be used in the THz wave.

TABLE 5

| Transceivers Device | Available immature: UTC-PD, RTD and SBD |
|---|---|
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

Figure 12:
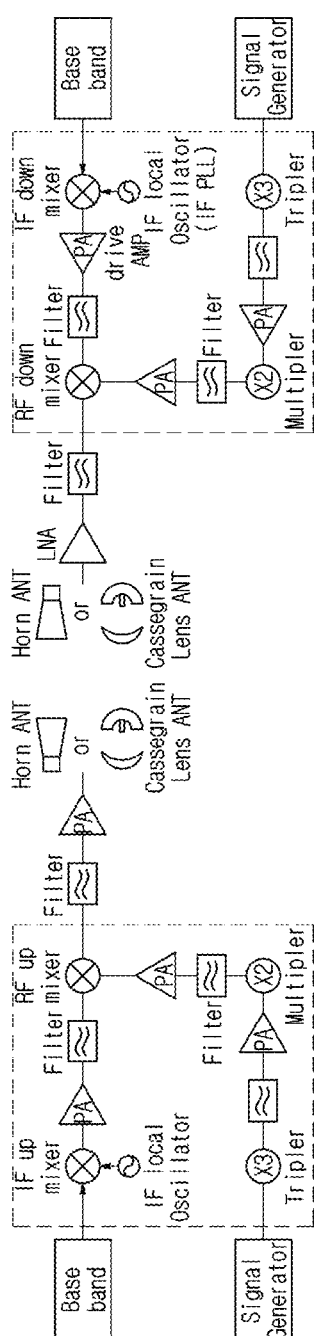
FIG. 12 is a view showing a THz wireless communication transceiver applicable to the present disclosure.

FIG. 12 is a view showing a THz wireless communication transceiver applicable to the present disclosure.

Referring to FIG. 12, THz wireless communication may be classified based on the method of generating and receiving THz. The THz generation method may be classified as an optical device or electronic device based technology.

At this time, the method of generating THz using an electronic device includes a method using a semiconductor device such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 12, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 12. In FIG. 12, IF represents an intermediate frequency, a tripler and a multiplier represents a multiplier, PA represents a power amplifier, and LNA represents a low noise amplifier, and PLL represents a phase-locked loop.

Figure 13:
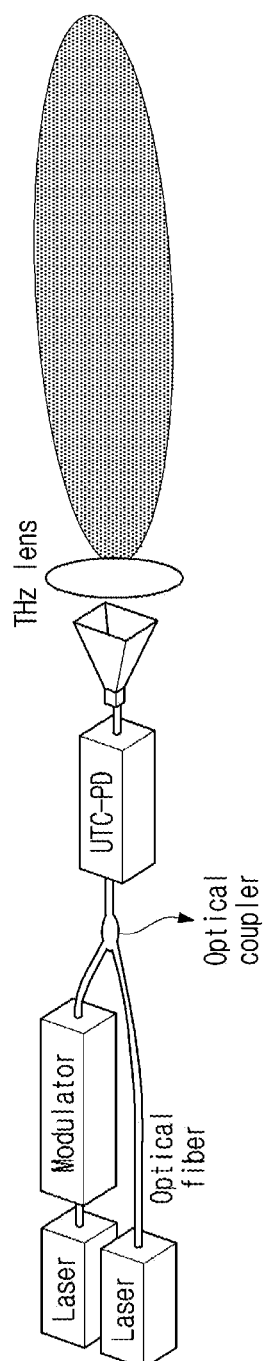
FIG. 13 is a view showing a THz signal generation method applicable to the present disclosure.
Figure 14:
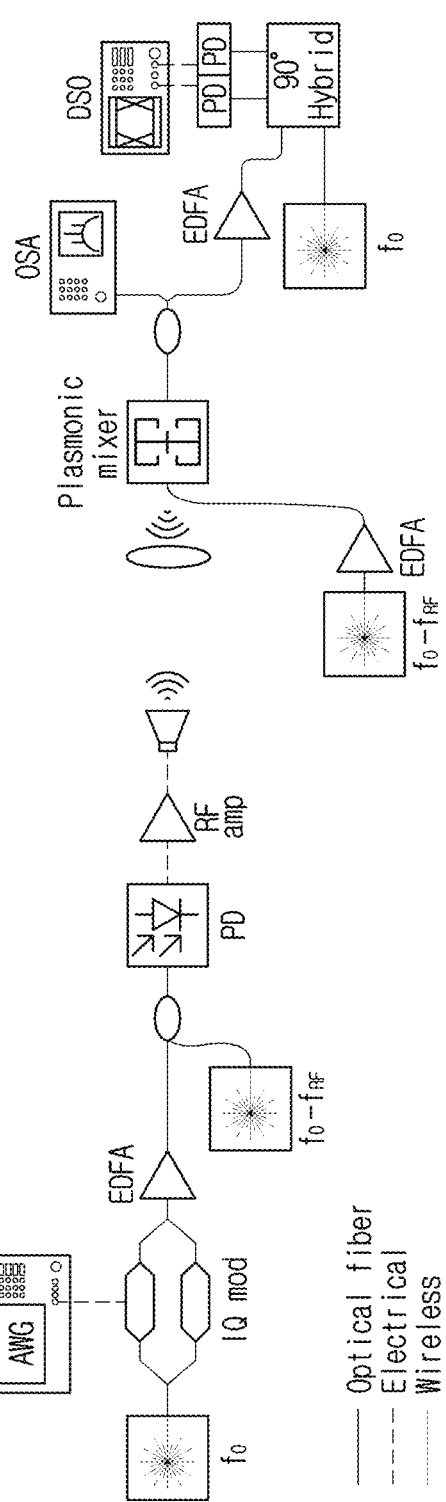
FIG. 14 is a view showing a wireless communication transceiver applicable to the present disclosure.

FIG. 13 is a view showing a THz signal generation method applicable to the present disclosure FIG. 14 is a view showing a wireless communication transceiver applicable to the present disclosure.

Referring to FIGS. 13 and 14, the optical device-based THz wireless communication technology means a method of generating and modulating a THz signal using an optical device. The optical device-based THz signal generation technology refers to a technology that generates an ultra-high-speed optical signal using a laser and an optical modulator, and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the THz signal based on the optical device, as shown in FIG. 13, a laser diode, a broadband optical modulator, and an ultrahigh-speed photodetector are required. In the case of FIG. 13, the light signals of two lasers having different wavelengths are combined to generate a THz signal corresponding to a wavelength difference between the lasers. In FIG. 13, an optical coupler refers to a semiconductor device that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 14, an erbium-doped fiber amplifier (EDFA) represents an optical fiber amplifier to which erbium is added, a photo detector (PD) represents a semiconductor device capable of converting an optical signal into an electrical signal, and OSA represents an optical sub assembly in which various optical communication functions (e.g., photoelectric conversion, electrophonic conversion, etc.) are modularized as one component, and DSO represents a digital storage oscilloscope.

Figure 15:
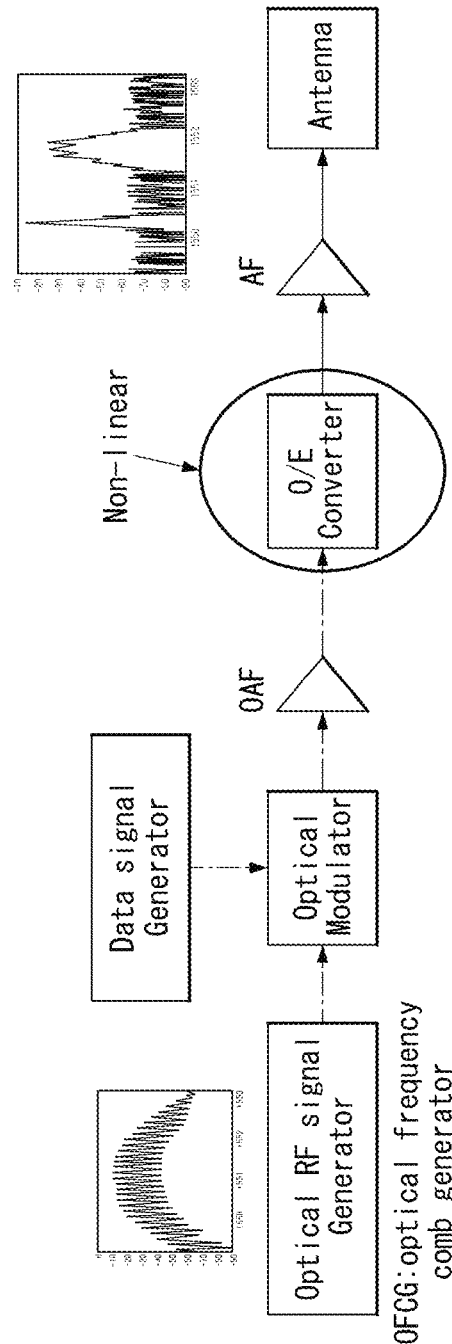
FIG. 15 is a view showing a transmitter structure applicable to the present disclosure.
Figure 16:
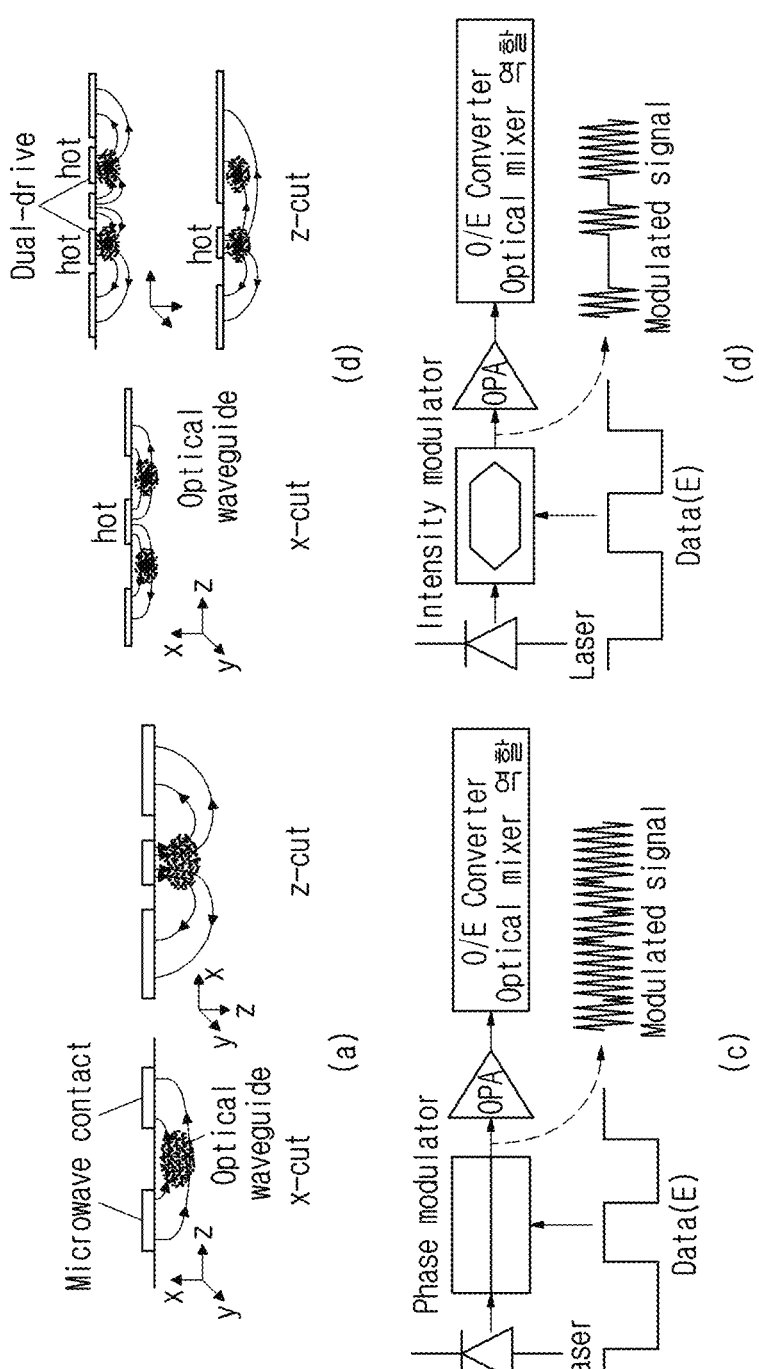
FIG. 16 is a view showing a modulator structure applicable to the present disclosure.

FIG. 15 is a view showing a transmitter structure applicable to the present disclosure. FIG. 16 is a view showing a modulator structure applicable to the present disclosure.

Referring to FIGS. 15 and 16, generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation $10^{\wedge 2}$ dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal non-linearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

Here, wireless communication technology implemented in the wireless devices 200a and 200b of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices of the present disclosure may perform communication based on LTE-M technology. In this case, as an example, the LTE-M technology may be an example of the LPWAN and may be called various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M. Additionally or alternatively, the wireless communication technology implemented in the wireless devices 200a and 200b of the present disclosure may include at least one of ZigBee, Bluetooth, and Low Power Wide Area Network (LPWAN) considering the low-power communication, and is not limited to the name described above. As an example, the ZigBee technology may generate personal area networks (PAN) associated with small/low-power digital communication based on various standards including IEEE 802.15.4, and the like, and may be called various names.

Contents Related to the Present Disclosure

The contents described above may be applied in combination with the embodiments proposed in the present disclosure to be described below or may be supplemented to clarify the technical characteristics of the embodiments proposed in the present disclosure. The embodiments described below are only separated for convenience of description and some components of an embodiment may be substituted with some components of another embodiment or may be applied in combination with each other.

Symbols/abbreviations/terms used in relation to embodiments of the present disclosure to be described later are as follows.

AWGN: Additive White Gaussian Noise

CP: Cyclic Prefix

CS: Cyclic Shift

Figure 17:
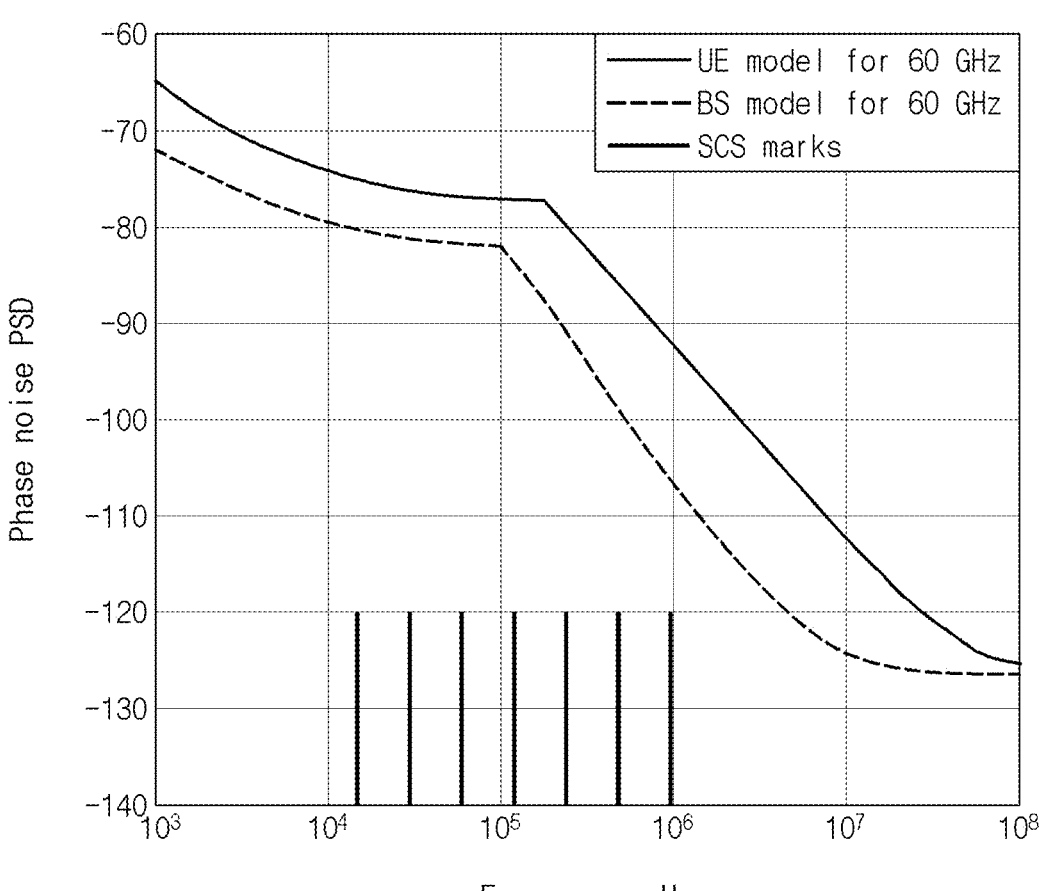
FIG. 17 is a graph illustrating phase noise applicable to the present disclosure.

DFT-s-OFDM: Discrete Fourier Transform-Spread-Orthogonal Frequency Division Multiplexing DL: Downlink DAO: Data Allocation Offset FDE: Frequency Domain Equalization FDMA: Frequency Division Multiple Access ICI: Inter-Carrier Interference ISI: Inter-Symbol Interference OFDM: Orthogonal Frequency Division Multiplexing PN: Phase Noise PSS: Primary Synchronization Signal RE: Resource Element RB: Resource Block SCS: Sub Carrier Spacing SPS: Semi Persistent Scheduling THz: Terahertz UL: Uplink FIG. 17 is a graph illustrating phase noise applicable to the present disclosure.

In a communication system in a high frequency band, phase noise may occur. Phase noise may be expressed as in Equation 1 below.

$$L(f_m) = 10 \log_{10}\left[\frac{1}{2}\left(\left(\frac{f_0}{2Q_l f_m}\right)^2 + 1\right)\left(\frac{f_c}{f_m} + 1\right)\left(\frac{FkT}{P_s}\right)\right] \qquad \text{[Equation 1]}$$

In Equation 1, f0 may be an operating frequency, Q may be a Q value of an oscillator, fm may be an offset frequency, fc may be a cutoff frequency, F may be a noise constant of a buffer amplifier, and T may be a Kelvin temperature, and Pc may be an output of an oscillator.

According to Equation 1, the phase noise may increase by 6 dB when the carrier frequency doubles. To compensate for the phase noise, a phase tracking reference signal (PT-RS) has been introduced in the mmWave band communication system of 5G NR. However, the phase tracking RS is for compensating for phase noise of a data channel. Therefore, in a synchronization step, the phase noise of the channel may not be compensated for, and the terminal may detect a synchronization signal block.

In order to compensate for the phase noise in the synchronization step, there is a method of increasing a size of a sub-carrier spacing, but as the size of the sub-carrier spacing increases, the size of the OFDM symbol and cyclic prefix (CP) may be reduced. In this case, signal may be distorted due to ISI when a multi-cell, distributed multi-input multi-output (MIMO) or reconfigurable intelligent surface (RIS) is used or when a channel is a multi-path fading channel in an indoor propagation environment. Therefore, there is a limit to increasing the size of the sub-carrier spacing as the carrier frequency increases.

Meanwhile, LTE/LTE-A uses cyclic prefix based orthogonal frequency division multiplexing (CP-OFDM) in downlink as an access method and discrete Fourier transform spread orthogonal frequency division multiplexing (DFT-s-OFDM) in uplink. DFT-s-OFDM is better known by the name single carrier frequency division multiple access (SC-FDMA). 5G NR also uses CP-OFDM as an access method, and unlike LTE, CP-OFDM is also supported in uplink. DFT-s-OFDM is still valid as an access method in the uplink of 5G NR, and all devices supporting 5G NR may necessarily support DFT-s-OFDM. The network may determine an access method to be used for uplink among CP-OFDM and DFT-s-OFDM.

When CP-OFDM is used in a frequency band corresponding to FR2 of 5G NR and/or a frequency band corresponding to a THz band of 6G, peak-to-average power ratio (PAPR) may increase. Accordingly, discussions are underway to use DFT-s-OFDM with a relatively low PARP as a downlink access method.

DFT-s-OFDM has a PAPR lower than OFDM and has advantages over OFDM in compensating phase noise. DFT-s-OFDM has an advantage over OFDM in compensating for phase noise because it may map a phase tracking RS in units of samples in the time domain and use an interpolation technique. When phase noise may be compensated for in the synchronization phase through DFT-s-OFDM, it may not be necessary to increase the sub-carrier spacing.

Figure 18:
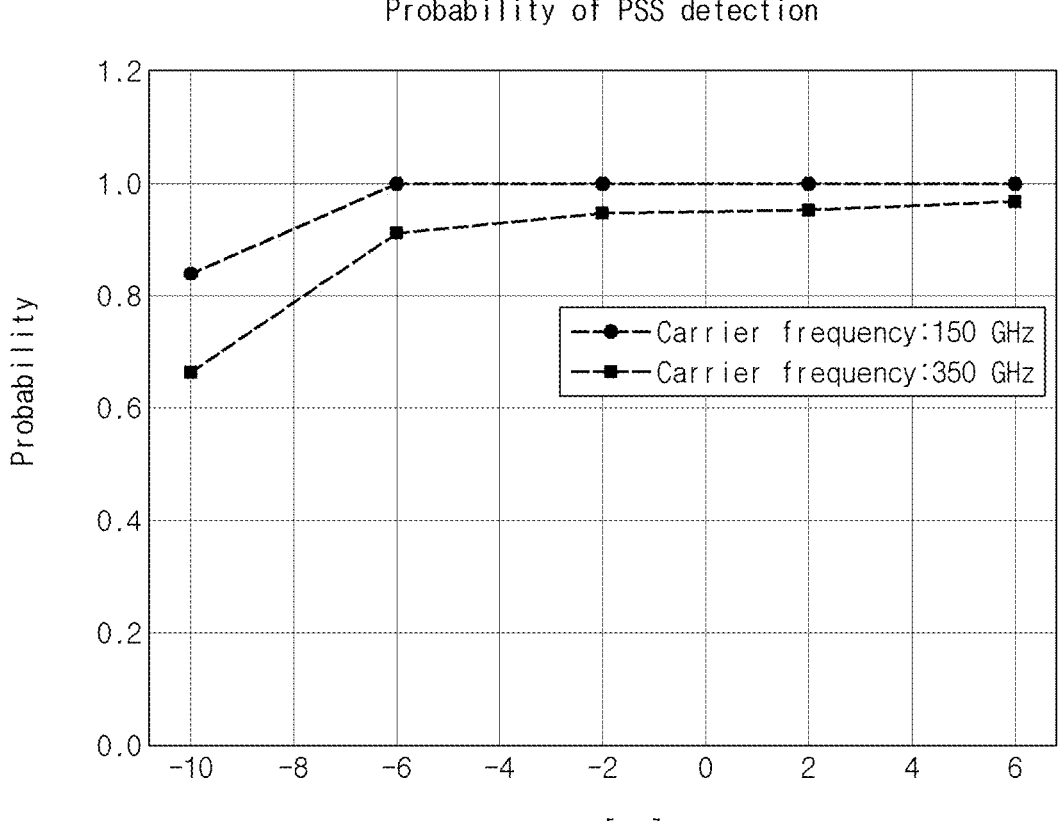
FIG. 18 is a graph illustrating a probability of primary synchronization signal (PSS) detection of a user equipment (UE) applicable to the present disclosure.

Meanwhile, one cell may include three cell sectors, and a cell ID may be divided into cell sector IDs. A BS may transmit cell area information to a UE through a primary synchronization signal (PSS). Here, the cell area information may include a cell area ID. FIG. 18 is a graph illustrating a probability of PSS detection of a UE applicable to the present disclosure.

FIG. 18 shows the probability that a terminal may detect a PSS according to a signal-to-noise ratio (SNR) when phase noise according to a carrier frequency is generated using a phase noise model (multi pole zero) and an existing PSS structure is used. Also, in FIG. 18, the size of the sub-carrier spacing may be 240 KHz.

Referring to FIG. 18, when the carrier frequency is 150 GHz, if the SNR value is greater than a certain value (e.g., −6 dB), the probability that the terminal detects the PSS may be 1, but when the carrier frequency is 150 GHz, the probability that the terminal detects the PSS does not converge to 1 even if the SNR value increases.

Figure 19:
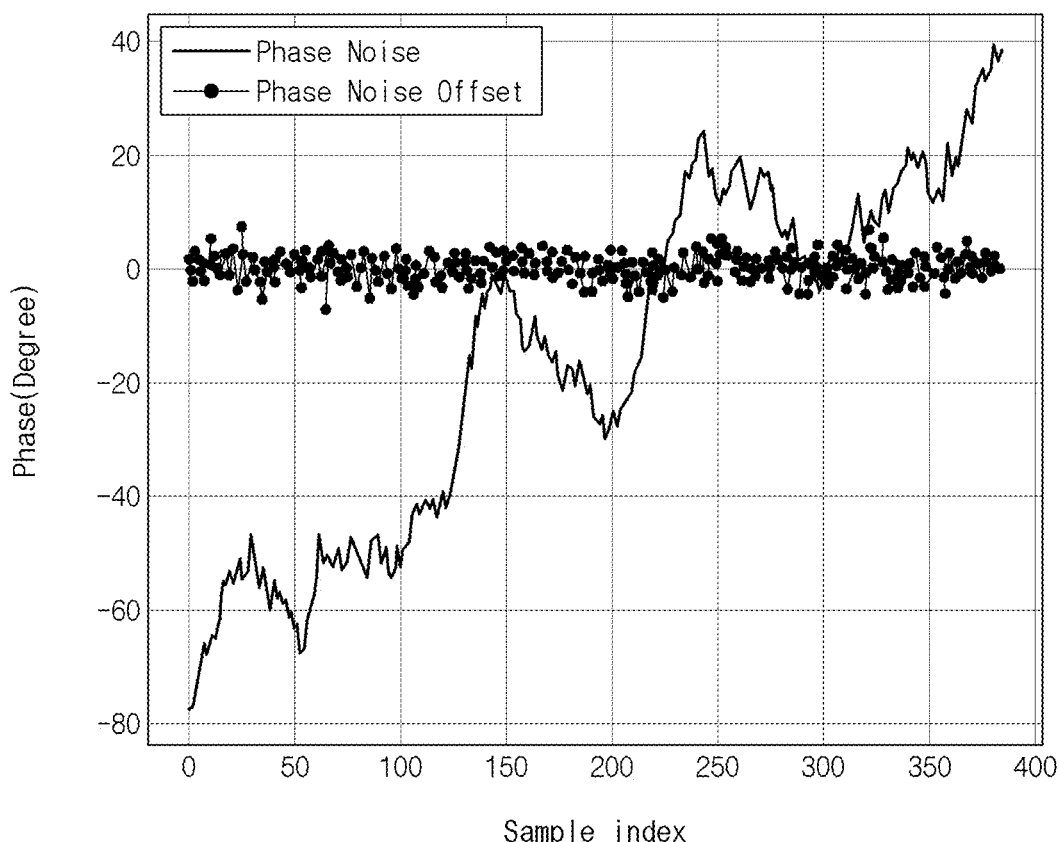
FIG. 19 is a graph illustrating phase noise and phase noise offset applicable to the present disclosure.

FIG. 19 is a graph illustrating phase noise and phase noise offset applicable to the present disclosure.

FIG. 19 shows phases of phase noise and phase noise offset according to a sample index when a carrier frequency is 350 GHz and the sub-carrier spacing is 240 kHz. Also, the phase noise may be generated using the same phase noise model as in the case of FIG. 18, and in this case, correlation may exist between the phase noise and the time sample.

Referring to FIG. 19, when the carrier frequency is 350 GHz, the phase of the phase noise offset may be very small. The present disclosure provides a PSS capable of removing phase noise by using characteristics of phase noise generated when a UE detects a PSS, and a PSS detection method of a UE using the PSS.

A BS may allocate a PSS to a DFT-s-OFDM symbol. That is, the BS may map the PSS in a time domain. This may be using the characteristics of DFT-s-OFDM capable of mapping signals in both the frequency domain and time domain like OFDM, and may be different from OFDM that maps PSS to the frequency domain.

The UE may obtain the PSS in the time domain, and may detect cell area information by applying a correlation value of the size of the sequence to the PSS. Here, the cell area information may include a cell ID.

When the PSS is allocated to the time domain in this way, phase noise of the PSS may be removed by applying differential coding using phase noise between samples as described above. A detailed description thereof may be as follows.

Figure 20:
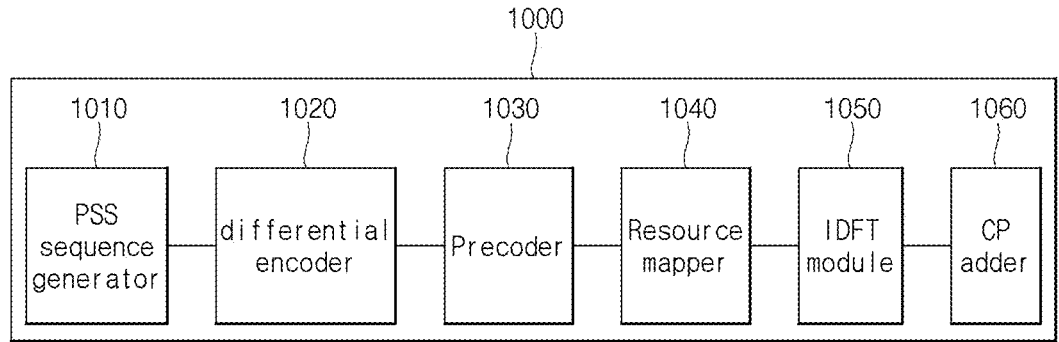
FIG. 20 is a block diagram of a base station applicable to the present disclosure.
Figure 21:
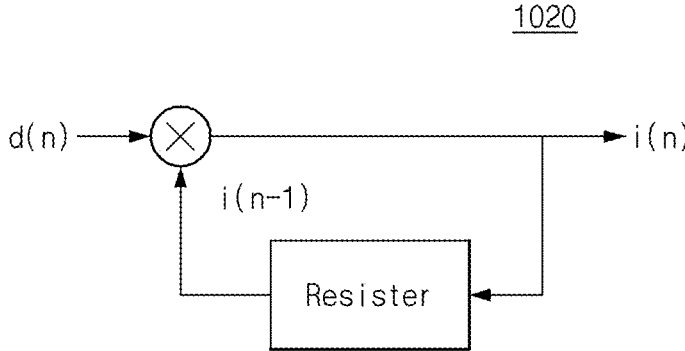
FIG. 21 is a conceptual diagram of a differential encoder applicable to the present disclosure.

FIG. 20 is a block diagram of a BS applicable to the present disclosure. FIG. 21 is a conceptual diagram of a differential encoder applicable to the present disclosure.

Referring to FIGS. 20 to 21, a BS 1000 may include a PSS sequence generator 1010, a differential encoder 1020, a precoder 1030, a resource mapper 1040, an IDFT module 1050, and a CP adder 1060. The PSS sequence generator 1010 may generate a PSS sequence based on cell area information. In the PSS sequence generator 100, for example, the BS may generate a PSS sequence based on an m-sequence or a Zadoff-Chu (ZC) sequence, but this is an example and the present disclosure is not limited thereto. The BS may generate a PSS sequence based on Equations 2 to 6 below.

$$d(n) \ni \{1,-1\} \qquad \text{[Equation 2]}$$

$$d(n)=1-2x(m)$$

$$m=(n+43N_{ID}^{(2)})\bmod 127$$

$$0 \leq n < 127 \qquad \text{[Equation 3]}$$

$$x(i+7)=(x(i+4)+x(i))\bmod 2 \qquad \text{[Equation 4]}$$

$$[x_{(6)},x_{(5)},x_{(4)},x_{(3)},x_{(2)},x_{(1)},x_{(0)}]=[1\ 1\ 1\ 0\ 1\ 1\ 0] \qquad \text{[Equation 5]}$$

$$N_{ID}^{cell}=3N_{ID}^{(1)}+N_{ID}^{(2)} \qquad \text{[Equation 6]}$$

In Equations 2 to 6, d(n) may be a PSS sequence of an n-th time sample, and NB may be a cell ID in a third area of the cell. Here, the n-th time sample may be an n-th time sample in DFT-s-OFDM. Also, $N_{ID}^{(1)} \in \{0, 1, \ldots, 335\}$, and $N_{ID}^{(2)}=\{0, 1, 2\}$. The PSS sequence generated by the BS based on Equations 2 to 6 may be shown in Table 6 below.

TABLE 6

| $N_{ID}^{(2)}$ | $d_{PSS}(0)$, $d_{PSS}(1)$, ..., $d_{PSS}(125)$, $d_{PSS}(126)$ |
|---|---|
| 0 | 1, −1, −1, 1, −1, −1, −1, −1, 1, 1, −1, −1, −1, 1, 1, −1, 1, −1, 1, −1, −1, 1, 1, −1, −1, 1, 1, 1, 1, 1, −1, −1, 1, 1, −1, −1, 1, 1, 1, 1, −1, −1, −1, 1, −1, 1, 1, 1, 1, −1, −1, 1, 1, −1, 1, 1, 1, 1, −1, 1, 1, 1, 1, −1, 1, 1, −1, 1, 1, −1, −1, 1, −1, 1, 1, −1, −1, −1, −1, 1, −1, −1, 1, 1, 1, 1, 1, −1, 1, 1, −1, −1, −1, −1, −1, 1, 1, 1, 1, −1, −1, 1, −1, −1, 1, 1, 1, 1, −1, 1, 1, −1, 1, 1, 1, 1, −1, −1, −1, −1, −1, 1, −1, 1, 1, −1, 1, 1, −1, 1, 1, 1, 1, 1, −1 |
| 1 | 1, 1, 1, −1, −1, 1, 1, −1, 1, 1, 1, −1, 1, 1, 1, 1, 1, 1, 1, −1, 1, 1, −1, 1, 1, −1, −1, 1, −1, 1, 1, −1, −1, −1, −1, 1, 1, −1, −1, −1, 1, 1, 1, −1, −1, 1, −1, −1, −1, −1, −1, 1, 1, 1, 1, −1, −1, −1, 1, −1, −1, 1, 1, 1, 1, −1, 1, 1, −1, 1, 1, −1, −1, −1, −1, −1, 1, −1, 1, 1, −1, −1, 1, 1, 1, 1, −1, −1, 1, 1, −1, −1, 1, 1, −1, −1, −1, −1, 1, 1, −1, −1, −1, 1, 1, 1, −1, 1, 1, −1, 1, −1, −1, 1, 1, 1, −1, −1, 1, 1, 1, 1, 1, −1, −1, 1, 1, −1, −1, −1, −1, 1, −1 |

TABLE 6-continued

| $N_{ID}^{(2)}$ | $d_{PSS}(0), d_{PSS}(1), \ldots, d_{PSS}(125), d_{PSS}(126)$ |
|---|---|
| 2 | -1, -1, -1, -1, -1, -1, 1, 1, 1, -1, -1, -1, 1, -1, -1, 1, 1, 1, -1, 1, -1, 1, 1, -1, 1, -1, -1, -1, -1, -1, 1, -1, 1, -1, 1, -1, 1, 1, 1, 1, -1, 1, -1, -1, 1, -1, -1, -1, -1, -1, 1, 1, 1, -1, -1, -1, 1, 1, -1, 1, -1, 1, -1, -1, -1, 1, 1, 1, 1, 1, -1, -1, -1, 1, 1, -1, 1, -1, -1, 1, 1, -1, -1, 1, 1, 1, 1, 1, 1, -1, -1, 1, -1, -1, 1, -1, 1, -1, -1, -1, -1, 1, -1, 1, 1, 1, 1, -1, -1, 1, 1, -1, 1, 1, 1, 1, 1, 1, 1, 1, -1, 1, 1, 1, -1, 1, 1, -1, -1, 1, -1, 1, -1, -1, -1, -1, 1, -1, -1, -1, 1, 1, 1, 1, -1 |

The PSS sequence generator 1010 may transmit the PSS sequence to the differential encoder 1020.

The differential encoder 1020 may receive the PSS sequence from sequence generator 1010. The differential encoder 1020 may perform differential encoding on the PSS sequence. The differential encoder 1020 may be configured as shown in FIG. 21. The differential encoder 1020 may perform differential encoding on the PSS sequence based on Equation 7.

$$i(n)=d(n)\times conj\{d(n-1)\} \qquad \text{[Equation 7]}$$

In Equation 7, i(n) may be a PSS sequence of the n-th time sample on which differential encoding is performed, and d(n−1) may be a PSS sequence of the (n−1)-th time sample. The differential encoder 1020 may transmit the PSS sequence on which differential encoding is performed to the precoder 1030.

The precoder 1030 may receive the PSS sequence on which differential encoding is performed from the differential encoder 1020. The precoder 1030 may perform DFT (M-point DFT) on the PSS sequence on which differential encoding is performed. The precoder 1030 may transmit the DFT-performed PSS sequence to the resource mapper 1040.

The resource mapper 1040 may receive the DFT-performed PSS sequence from the precoder 1030. The resource mapper 1040 may map the DFT-performed PSS sequence to a resource. The resource mapper 1040 may transmit the resource to which the PSS sequence is mapped to the IDFT module 1050.

The IDFT module 1050 may receive the resource to which the PSS sequence is mapped from the resource mapper 1040. The IDFT module 1050 may generate a DFT-s-OFDM symbol by performing N-point IDFT (IDFT) on the resource to which a PSS sequence is mapped. The IDFT module 1050 may transmit the DFT-s-OFDM symbol to the CP adder 1060.

The CP adder 1060 may receive a DFT-s-OFDM symbol from the IDFT module 1050. The CP adder 1060 may generate a downlink (DL) signal by adding a CP to the DFT-s-OFDM symbol. The CP adder 1060 may transmit the DL signal to the UE. The DL signal transmitted to the UE is referred to as a transmission signal.

Figure 22:
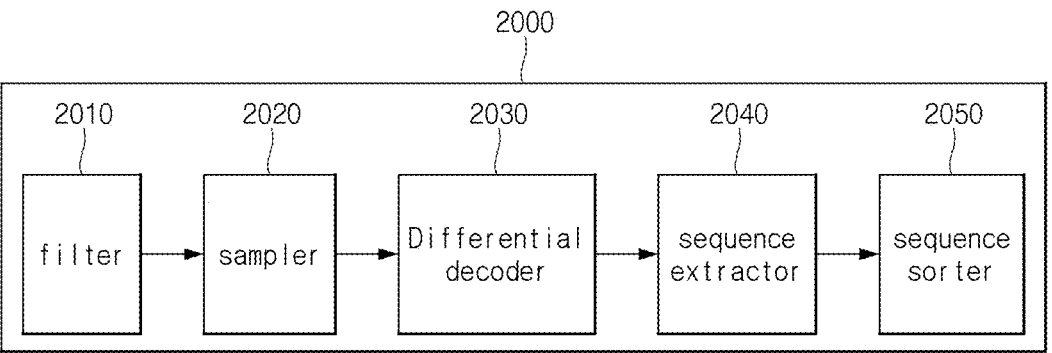
FIG. 22 is a block diagram of a UE applicable to the present disclosure.
Figure 23:
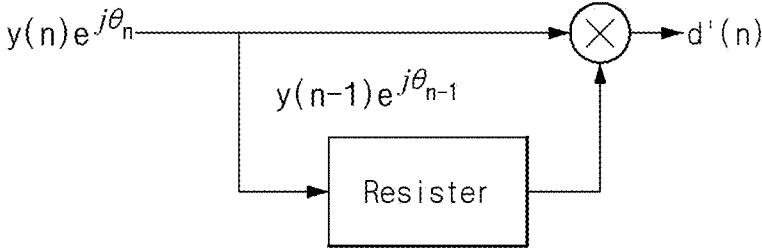
FIG. 23 is a conceptual diagram of a differential decoder applicable to the present disclosure.
Figure 24:
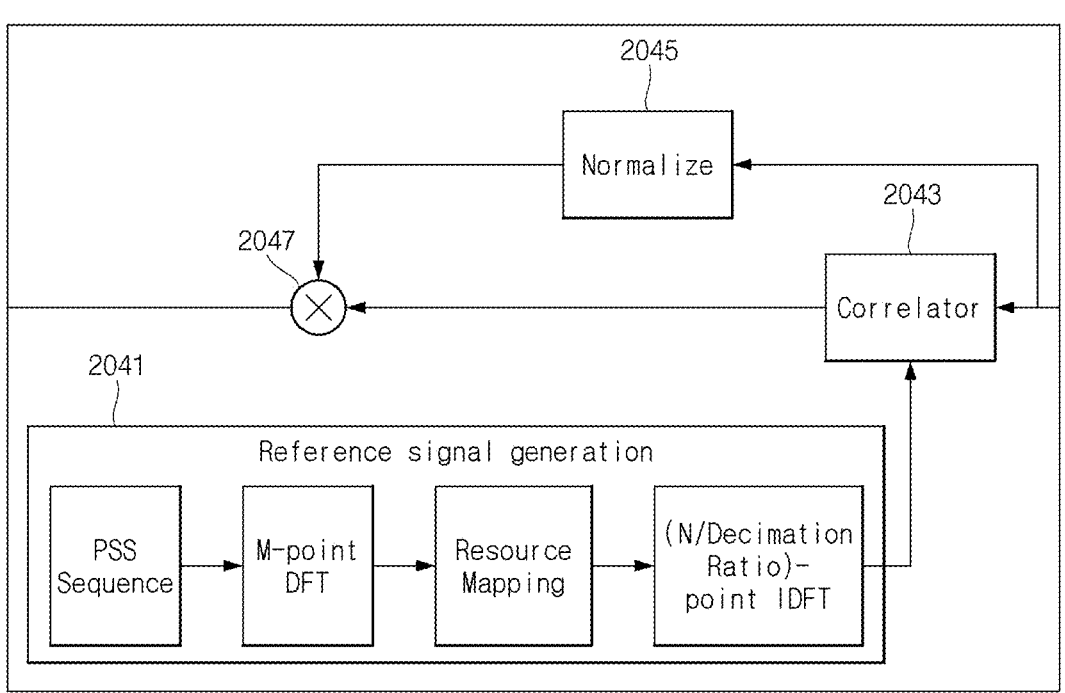
FIG. 24 is a conceptual diagram of a sequence extractor applicable to the present disclosure.

FIG. 22 is a block diagram of a UE applicable to the present disclosure. FIG. 23 is a conceptual diagram of a differential decoder applicable to the present disclosure. FIG. 24 is a conceptual diagram of a sequence extractor applicable to the present disclosure.

Referring to FIG. 22, a UE 2000 may include a filter 2010, a sampler 2020, a differential decoder 2030, a sequence extractor 2040, and a sequence sorter 2050.

The filter 2010 may receive a DL signal. The filter 2010 may be a low pass filter (LPF). The DL signal received by the filter 2010 is referred to as a reception signal. The reception signal may be expressed as in Equation 6 below.

$$y(n)=h(n)\text{*}x(n)+\text{noise}(n) \qquad \text{[Equation 8]}$$

In Equation 8, y(n) may be the reception signal of the n-th time sample, h(n) may be a channel state of the n-th time sample, and x(n) may be a transmission signal of the n-th time sample. Noise(n) may be channel noise of the n-th time sample. The filter 2010 may filter the reception signal. The filter 2010 may transmit the filtered reception signal to the sampler 2020.

The sampler 2020 may receive the filtered reception signal from the filter 2010. The sampler 2020 may be a decimator. The sampler 2020 may sample the filtered reception signal. Here, sampling may be downsampling. The sampler 2020 may transmit the sampled reception signal to the differential decoder 2030.)

The differential decoder 2030 may receive the sampled reception signal from the sampler 2020. The differential decoder 2030 may be configured as shown in FIG. 24. The differential decoder 2030 may perform differential decoding based on Equation 9 below.

$$d'(n)=y(n)e^{j\theta_n}\times conj\{y(n-1)e^{j\theta_{n-1}}\} \qquad \text{[Equation 9]}$$

In Equation 9, d'(n) may be the reception signal on which differential decoding is performed, and y(n−1) may be the reception signal of the n−1th time sample. The differential decoder 2030 may transmit the differentially-decoded reception signal to the sequence extractor 2040.

The sequence extractor 2040 may receive the differentially-decoded reception signal from the differential decoder 2030. Referring to FIG. 24, the sequence extractor 2040 may include a reference signal generator 2041, a correlator 2043, a normalizer 2045, and a multiplier 2047.

The reference signal generator 2041 generates a PSS sequence, performs DFT (M-point) on the PSS sequence, maps the PSS sequence on which the DFT is performed to a resource, and perform IDFT ((N/decimation ratio)−point IDFT) on the PSS-mapped resource to generate a reference signal (RS). Here, the PSS sequence may be a PSS sequence of the n−1th time sample. The reference signal generator 2041 may transmit the RS to the correlator 2043.

The correlator 2043 may receive the reception signal on which differential decoding is performed from the differential decoder 2030 and may receive the RS from the correlator 2043. The correlator may generate a correlation signal based on correlation between the differentially-decoded reception signal and the RS. The correlator 2043 may transmit the correlation signal to the multiplier 2047.

The normalizer 2045 may receive the reception signal on which differential decoding is performed from the differential decoder 2030. The normalizer 2045 may normalize the reception signal on which differential decoding is performed. The normalizer 2045 may transmit the normalized reception signal to the multiplier 2047.

The multiplier 2047 may receive the correlation signal from the correlator 2043 and may receive the normalized reception signal from the normalizer 2045. The multiplier 2047 may obtain a PSS sequence by performing a multiplication operation of the correlation signal and the normalized reception signal.

Meanwhile, the number of sequence extractors 2040 may be plural. The number of sequence extractors 2040 may be equal to the number of cell areas present in one cell. That is, when three cell areas of one cell exist, the number of sequence extractors 2040 may be three. In this case, the respective sequence extractors 2040 may obtain a PSS sequence corresponding to each cell area information.

The sequence extractor 2040 may obtain the PSS sequence based on Equations 10 to 12 below.

[Equation 10]

$$d'(n) = |h(n) \times h(n-1)| * x(n) \times x(n-1)e^{j\Delta\theta} + noise(n) \times conj\{noise(n-1)\} +$$

$$conj\{noise(n-1)\} \times \{h(n) * x(n)\} + noise(n) \times conj\{h(n-1) * x(n-1)\}$$

[Equation 11]

$$d'(n) = |h(n) \times h(n-1)| * d(n)e^{j\Delta\theta} + noise(n) \times conj\{noise(n-1)\} +$$

$$conj\{noise(n-1)\} \times \{h(n) * x(n)\} + noise(n) \times conj\{h(n-1) * x(n-1)\}$$

$$d(n) = x(n) \times conj\{x(n-1)\}$$

[Equation 12]

In Equations 10 to 12, x(n−1) may be the (n−1)-th transmission signal, θn may be phase noise of the reception signal of the n-th time sample, Δθ may be a phase noise offset, h(n−1) may be a channel state of the (n−1)-th time sample, and noise (n−1) may be channel noise of the (n−1)-th time sample. The sequence extractor 2040 may provide the PSS sequence to the sequence sorter 2050.

The sequence sorter 2050 may receive the PSS sequence from the sequence extractor 2040. The number of sequence sorters 2050 may be plural, and may be the same as the number of sequence extractors 2040. For example, the number of sequence sorters 2050 may be three.

The sequence sorter 2050 may perform sorting on the PSS sequence to obtain cell area information. For example, when the three sequence sorters 2050 receive one PSS sequence respectively from the three sequence extractors 2040, the sequence sorters 2050 may perform sorting on each PSS sequence and to obtain area information on three different areas included in one cell.

Figure 25:
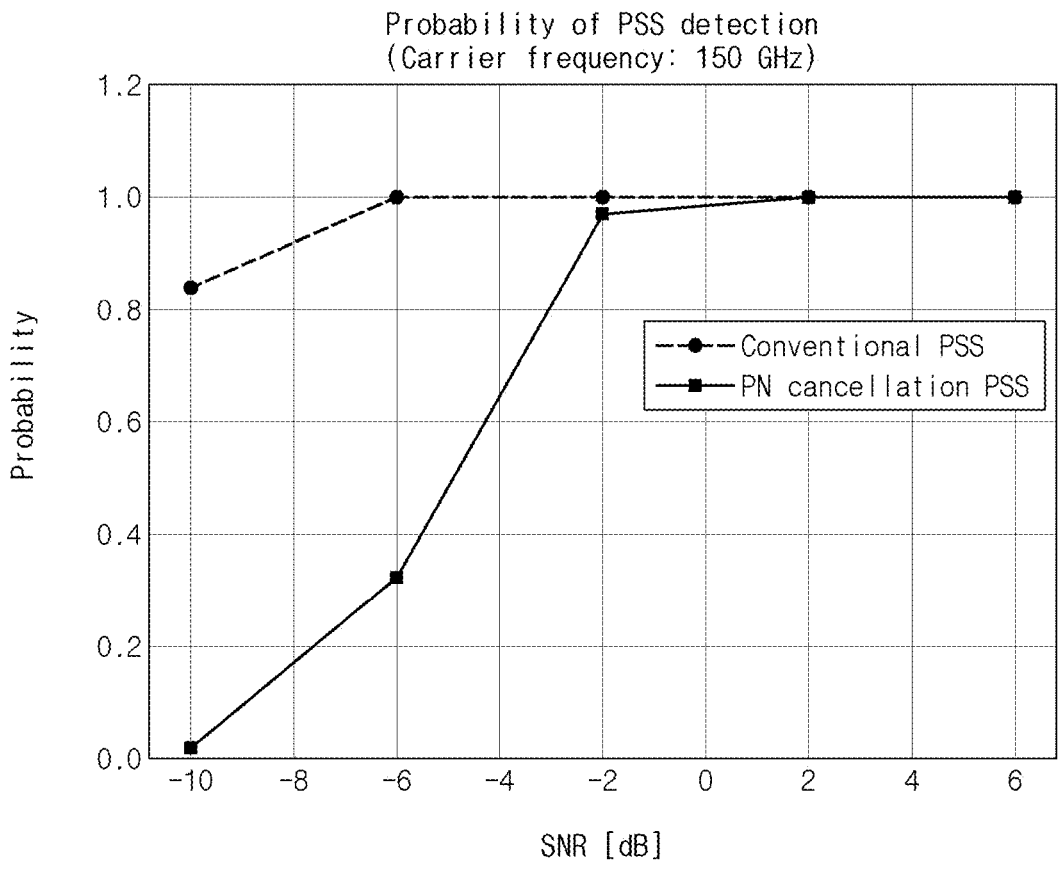
FIGS. 25 and 26 are graphs illustrating effects according to UEs applicable to the present disclosure.
Figure 26:
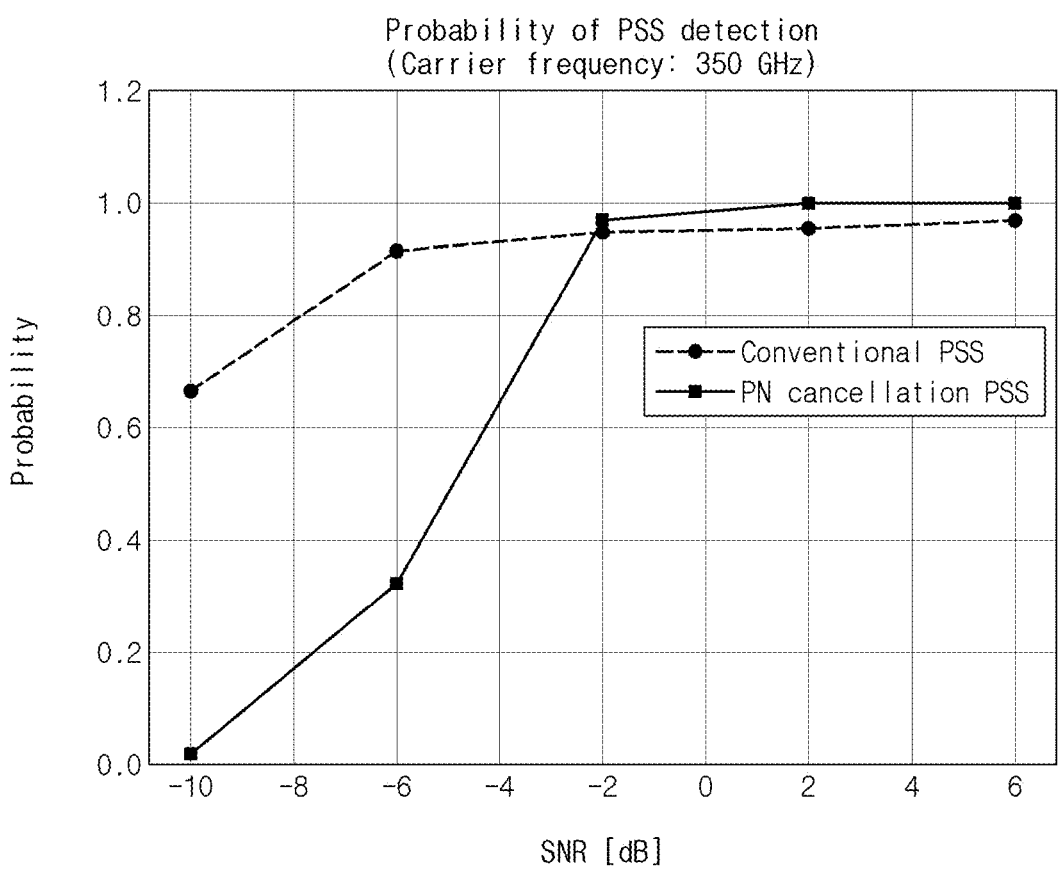

FIGS. 25 and 26 are graphs illustrating effects according to a UE applicable to the present disclosure.

FIGS. 25 to 26 are graphs illustrating the probability that a UE may detect a PSS based on an existing PSS and the probability that a UE may detect a PSS based on a PSS from which phase noise has been removed. Here, the PSS from which phase noise has been removed may be the PSS of FIGS. 20 to 24.

FIG. 25 is a graph illustrating a probability that a UE may detect a PSS when a carrier frequency is 150 GHz. FIG. 26 is a graph illustrating a probability that a UE may detect a PSS when a carrier frequency is 350 GHz. In FIGS. 25 and 26, the sub-carrier spacing may be 240 kHz, the size of the IFFT may be 1024, the size of the DFT may be 128, and the phase noise model may be multi pole zero.

Referring to FIGS. 25 and 26, when the carrier frequency is 150 GHz as shown in FIG. 25, the probability that the UE may detect the PSS based on the existing PSS and the probability that the UE may detect the PSS from which phase noise has been removed are substantially the same, but when the carrier frequency is 350 GHz and the size of the SNR is greater than a certain value as shown in FIG. 25, the probability that the UE may detect the PSS based on the PSS from which phase noise is removed is higher than the probability that the UE may detect the PSS based on the existing PSS. When the carrier frequency is 350 GHz and the size of the SNR is greater than 2 [dB], the probability may be 1 when the UE detects the PSS based on the PSS from which phase noise is removed.

However, when the magnitude of the SNR is equal to or less than a certain value, noise may be amplified during differential decoding of the PSS from which the phase noise has been removed. Due to this, there is a problem in that the probability that the UE may detect the PSS based on the PSS from which phase noise has been removed is very small compared to the probability that the UE may detect the PSS based on the existing PSS.

Figure 27:
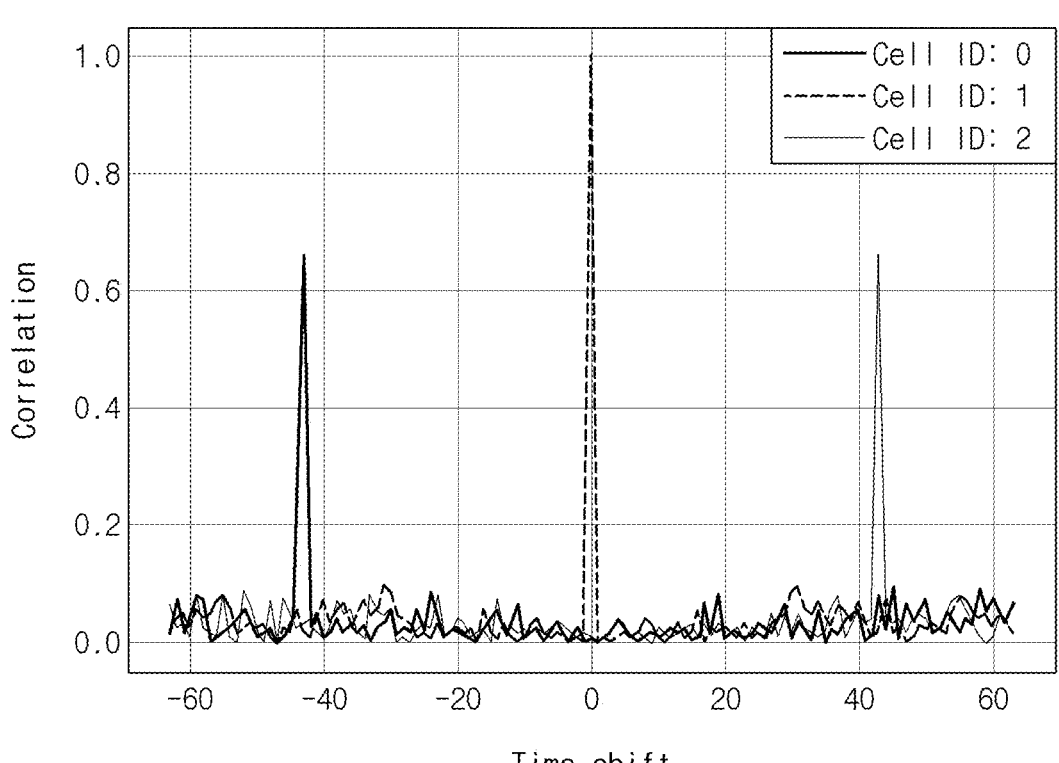
FIG. 27 is a conceptual diagram illustrating correlation by an existing PSS.
Figure 28:
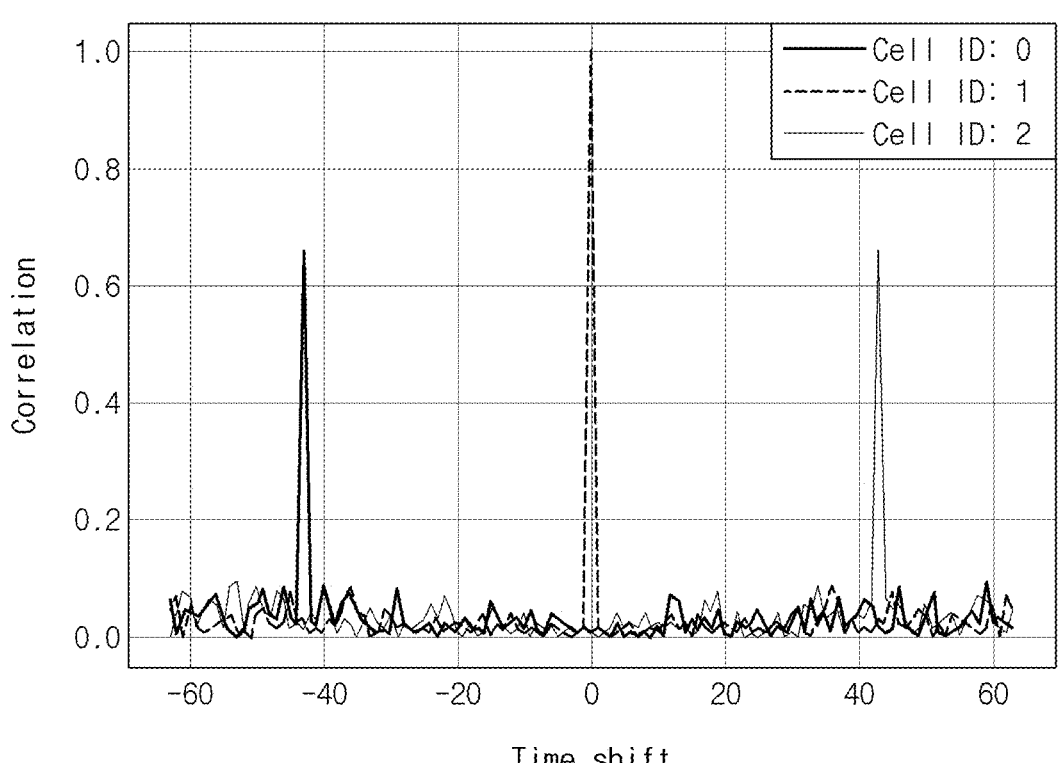
FIG. 28 is a conceptual diagram illustrating correlation by a PSS applicable to the present disclosure.

FIG. 27 is a conceptual diagram illustrating correlation by an existing PSS. FIG. 28 is a conceptual diagram illustrating correlation by PSS applicable to the present disclosure.

FIGS. 27 to 28 show the correlation of each cell ID according to time shift. Referring to FIGS. 27 and 28, it can be seen that the correlation of the existing PSS and the correlation of the PSS generated by performing differential encoding are almost the same. Using this characteristic, it is possible to prevent the probability of PSS detection from decreasing when the SNR value is less than or equal to a certain value. A UE using these characteristics may be as follows.

Figure 29:
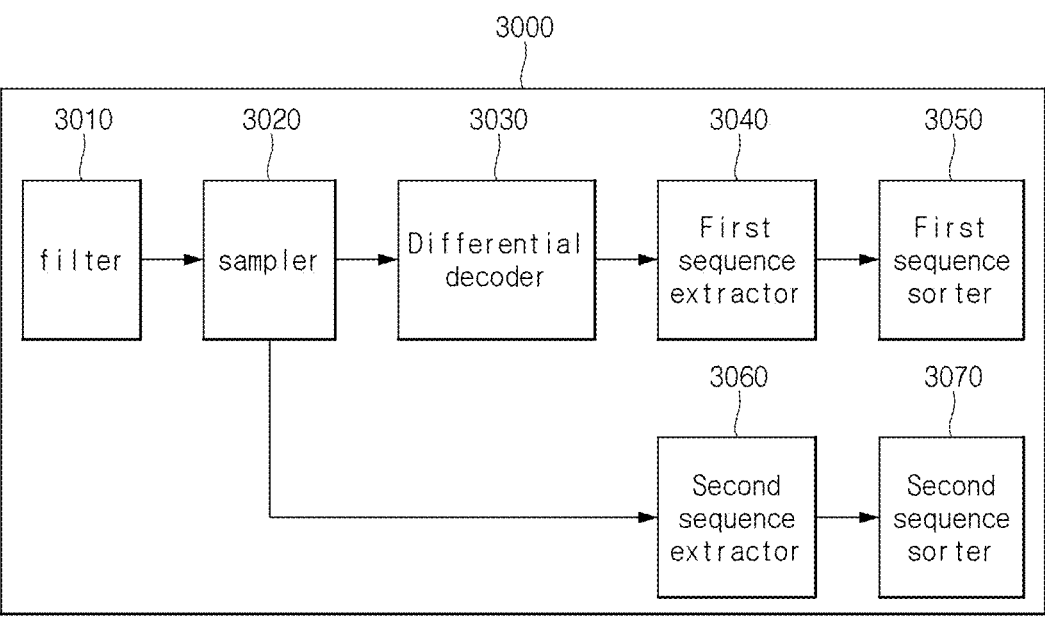
FIG. 29 is a block diagram of a UE applicable to the present disclosure.
Figure 30:
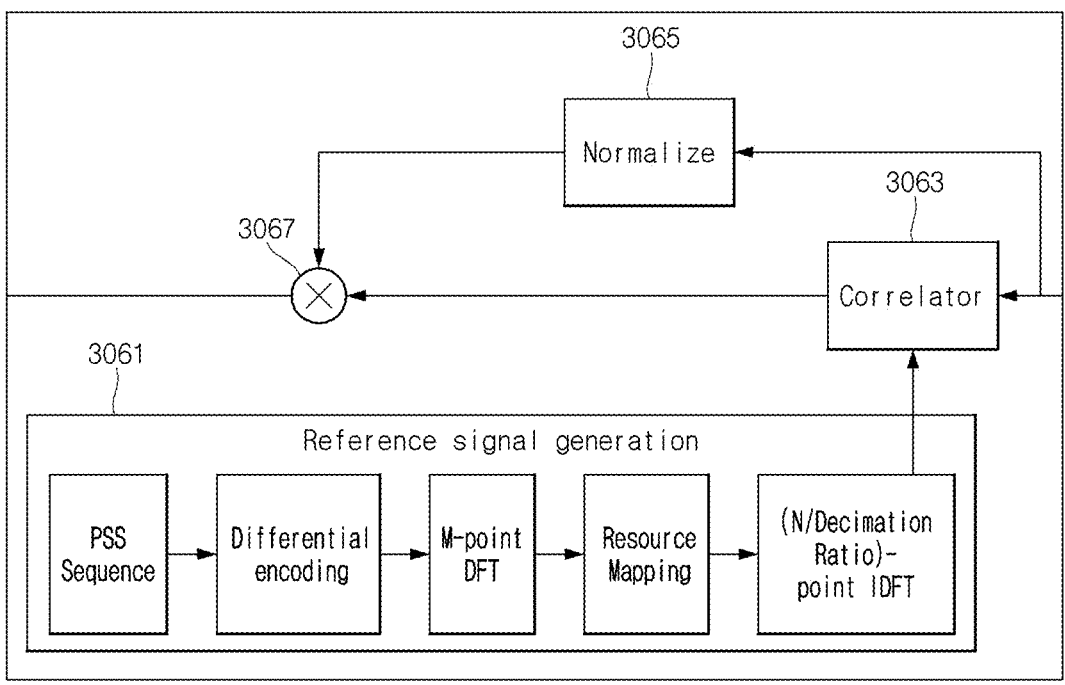
FIG. 30 is a conceptual diagram of a second sequence extractor applicable to the present disclosure.

FIG. 29 is a block diagram of a UE applicable to the present disclosure. FIG. 30 is a conceptual diagram of a second sequence extractor applicable to the present disclosure.

Referring to FIG. 29, a UE 4000 may include a filter 3010, a sampler 3020, a differential decoder 3030, a first sequence extractor 3040, a first sequence sorter 3050, a second sequence extractor 3060, and a second sequence sorter 3070.

The filter 3010, the differential decoder 3030, the first sequence extractor 3040, and the first sequence sorter 3050 may be the same as the filter 2010, the differential decoder 2030, the sequence extractor 2040, and the sequence sorter 2050 of FIG. 22, respectively. Also, the sampler 3020 may be the same as the sampler 2020 of FIG. 22 except for further providing the sampled reception signal to the second sequence extractor 3060.

The second sequence extractor 3060 may receive the sampled reception signal from the sampler 3020. The second sequence extractor 3060 may include an RS generator 3061, a correlator 3063, a normalizer 3065, and a multiplier 3067. The RS generator 3061 may generate a PSS sequence, perform differential encoding on the PSS sequence, perform DFT (M-point) on the differentially encoded PSS, map the DFT-performed PSS sequence to a resource, and perform IDFT ((N/decimation ratio)−point IDFT) on the resource to which the PSS is mapped to generate an RS. Here, the PSS sequence may be a PSS sequence of the (n−1)-th time sample. The RS generator 3061 may transmit the RS to the correlator 3063.

The correlator 3063 may receive the sampled reception signal from the sampler 3020 and may receive an RS from the RS generator 3061. The correlator 3063 may generate a correlation signal based on the sampled reception signal and the RS. The correlator 3063 may transmit the correlation signal to the multiplier 3067.

The normalizer 3065 may receive the sampled reception signal from the sampler 3020. The normalizer 3065 may normalize the sampled reception signal. The normalizer 3065 may transmit the normalized reception signal to the multiplier 3067.

The multiplier 3067 may receive the correlation signal from the correlator 3063 and receive the normalized reception signal from the normalizer 3065. The multiplier 3067 may perform a multiplication operation of the correlation signal and the normalized reception signal to obtain a PSS sequence.

Meanwhile, the number of second sequence extractors 3060 may be plural, and may be the same as the number of first sequence extractors 3040. For example, the number of second sequence extractors 3060 may be three. The second sequence extractor 3060 may transmit the PSS sequence to the second sequence sorter 3070.

The second sequence sorter 3070 may receive the PSS sequence from the second sequence extractor 3060. The second sequence sorter 3070 may perform sorting on the PSS sequence to obtain cell area information.

Figure 31:
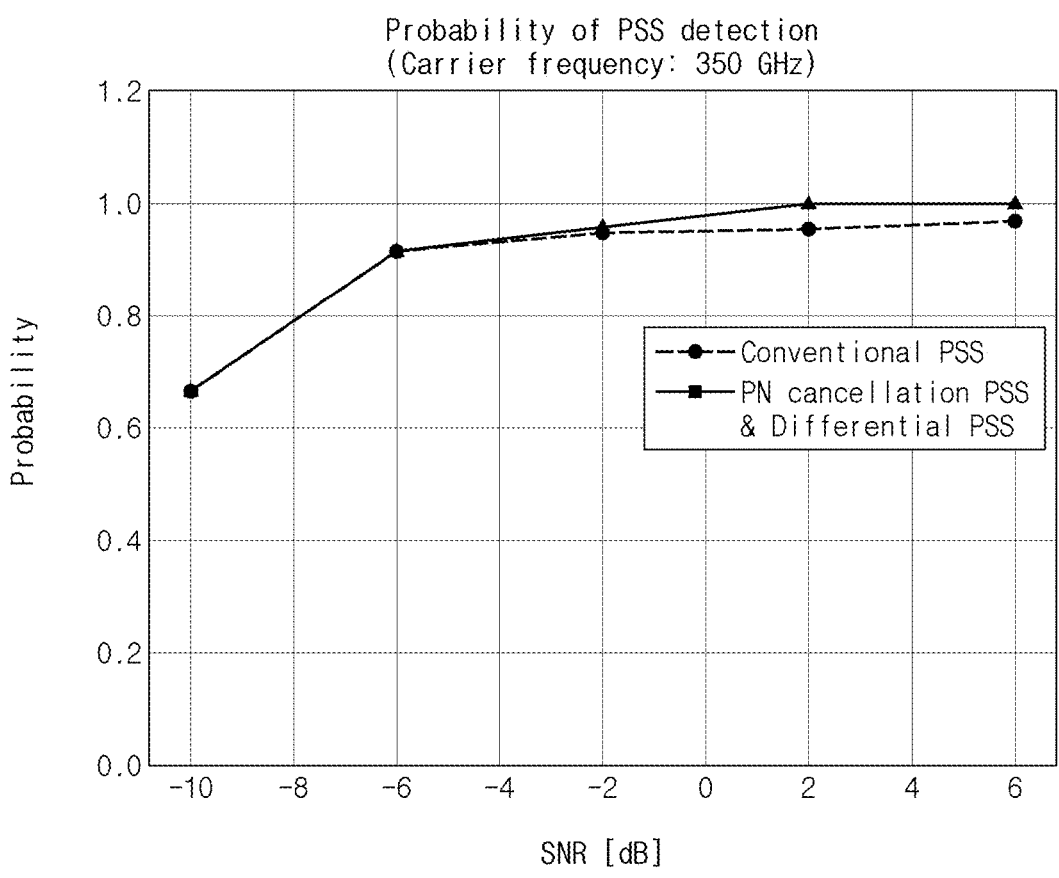
FIG. 31 is a graph illustrating effects of a UE applicable to the present disclosure.

FIG. 31 is a graph illustrating effects of a UE applicable to the present disclosure.

FIG. 31 is a graph illustrating probability of PSS detection of a UE compared to SNR when the sub-carrier spacing is 240 kHz, the carrier frequency is 350 GHz, the IFFT size is 1024, the DFT size is 128, and the phase noise model is multi pole zero.

Referring to FIG. 31, when the UE 4000 includes a first PSS sequence extractor 3040 and a second PSS sequence extractor 3060 in parallel as shown in FIG. 29 and the SNR is less than a predetermined value, a probability is the same as the existing method of detecting a PSS, and when the SNR is greater than the predetermined value, the probability may increase compared to the existing method of detecting a PSS.

Figure 32:
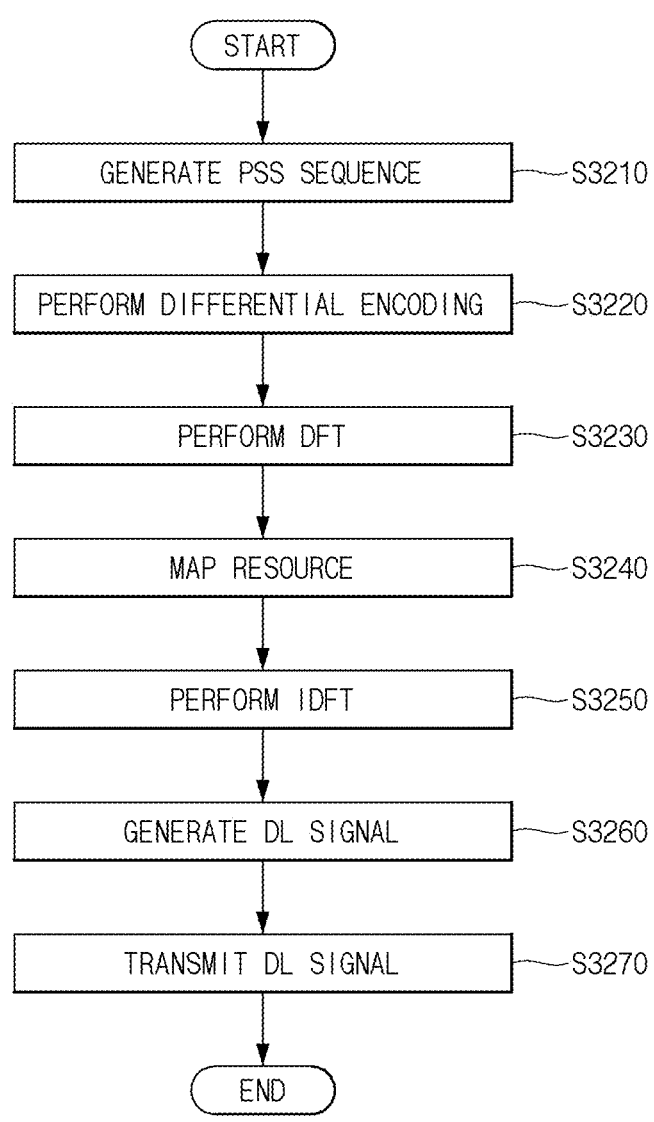
FIG. 32 is a flowchart of operations of a base station applicable to the present disclosure.

FIG. 32 is a flowchart of an operation of a BS applicable to the present disclosure.

Referring to FIG. 32, the BS may generate a PSS sequence (S3210). The BS may generate a PSS sequence based on cell area information. The BS may perform differential encoding on the PSS sequence (S3220). The BS may perform DFT on the differentially encoded PSS sequence (S3230). The BS may perform DFT (N-point DFT) on the differentially encoded PSS sequence. The BS may map a resource to the PSS sequence on which DFT is performed (S3240). The BS may generate a DFT-s-OFDM symbol based on the resource to which the PSS sequence is mapped. The BS may generate a DFT-s-OFDM symbol by performing IDFT (N-point IDFT) on the resource to which the PSS sequence is mapped. The BS may generate a DL signal by adding a CP to the DFT-s-OFDM symbol (S3260). The BS may transmit the DL signal to the UE (S3270).

Figure 33:
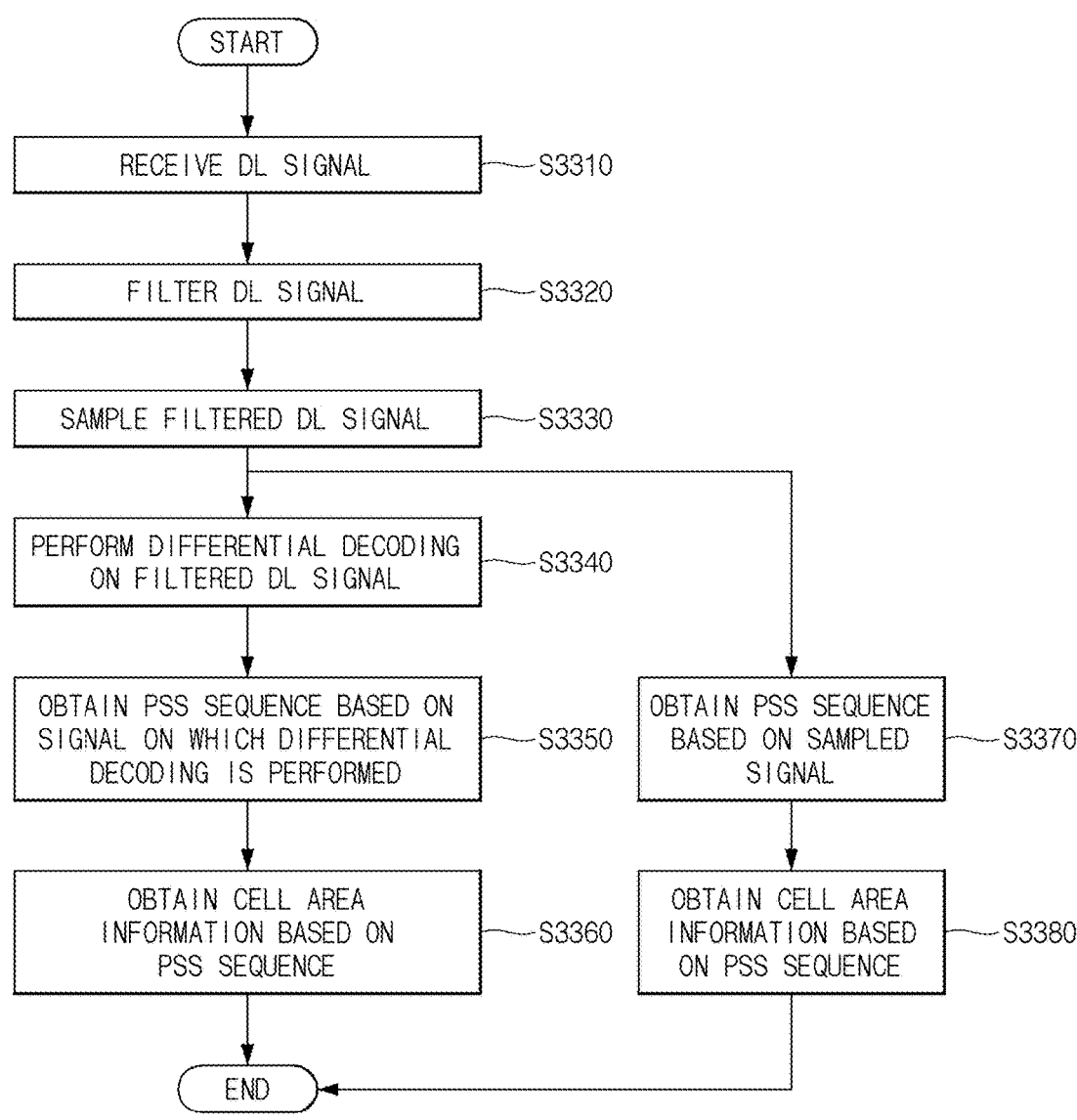
FIG. 33 is a flowchart of an operation of a UE applicable to the present disclosure.

FIG. 33 is a flowchart of an operation of a UE applicable to the present disclosure.

Referring to FIG. 33, the UE may receive a DL signal (S3310). The UE may filter the DL signal (SS320). The UE may perform filtering on the DL signal through a low pass filter.

The UE may sample the filtered DL signal (S3330). The UE may perform downsampling on the filtered DL signal.

The UE may perform differential decoding on the sampled DL signal (S3340).

The UE may obtain a PSS sequence based on the DL signal on which differential decoding is performed (S3350). The UE may obtain the PSS sequence based on a correlation of the DL signal. The UE may obtain the PSS sequence based on the correlation between the RS and the DL signal on which differential decoding is performed. Here, the RS may be generated by generating a PSS sequence at a time sample prior to a time sample at which the PSS sequence is generated, performing DFT on the PSS sequence, mapping a resource, and performing IDFT.

The UE may acquire cell area information (S3360). The UE may obtain cell domain information by sorting the PSS sequence obtained in step S3350. Here, the cell area information may include a cell area ID and a slot boundary.

Returning to S3330, the UE may obtain a PSS sequence based on the sampled DL signal (S3370). The UE may obtain the PSS sequence based on the correlation between the RS and the sampled DL signal. Here, the RS may be generated by generating a PSS sequence at a time sample prior to the time sample at which the PSS sequence was generated, performing differential encoding on the PSS sequence, performing DFT, mapping a resource, and performing IDFT.

The UE may obtain cell area information based on the PSS sequence (S3370). The UE may obtain cell domain information by sorting the PSS sequence obtained in S3360. Here, the cell area information may include a cell area ID.

Meanwhile, in the present disclosure, the BS generates a PSS sequence and applies differential encoding based thereon, but the same effect may be obtained even when the PSS sequence is configured as shown in Table 7 below.

TABLE 7

| $N_{ID}^{(2)}$ | $^{x}PSS(0), ^{x}PSS(1), \ldots, ^{x}PSS(125), ^{x}PSS(126)$ |
|---|---|
| 0 | 1, −1, 1, 1, −1, 1, −1, 1, 1, 1, −1, 1, −1, −1, −1, 1, |
| | 1, −1, −1, 1, −1, −1, −1, 1, −1, −1, −1, −1, −1, −1, |
| | 1, −1, −1, 1, −1, −1, 1, 1, −1, 1, −1, −1, 1, 1, 1, 1, −1, 1, |
| | 1, 1, −1, −1, −1, −1, 1, 1, 1, 1, 1, 1, 1, −1, −1, −1, 1, 1, |
| | 1, −1, 1, 1, −1, −1, −1, 1, −1, 1, −1, −1, 1, −1, 1, 1, 1, 1, |
| | 1, −1, 1, −1, 1, −1, 1, −1, −1, −1, −1, 1, −1, 1, 1, −1, 1, |
| | 1, 1, 1, −1, −1, 1, 1, 1, −1, −1, 1, −1, 1, −1, 1, 1, −1, −1, 1, |
| | 1, −1, −1, −1, −1, −1, 1 |
| 1 | 1, 1, 1, −1, 1, 1, 1, −1, −1, −1, −1, 1, 1, 1, 1, 1, 1, |
| | 1, −1, −1, −1, 1, 1, 1, 1, 1, −1, 1, 1, −1, −1, 1, 1, −1, |
| | 1, −1, −1, 1, −1, 1, 1, 1, 1, 1, −1, 1, −1, 1, −1, |
| | 1, −1, −1, −1, −1, 1, −1, 1, 1, −1, 1, 1, 1, 1, −1, −1, 1, 1, |
| | 1, −1, −1, 1, −1, 1, −1, 1, 1, −1, −1, 1, |
| | 1, −1, −1, −1, −1, 1, 1, −1, 1, 1, −1, 1, −1, 1, 1, 1, 1, −1, |
| | 1, −1, −1, −1, 1, 1, −1, −1, 1, 1, −1, −1, −1, |
| | 1, −1, −1, −1, −1, −1, 1, −1, −1, 1, −1, −1, 1, 1, −1, |
| 2 | 1, −1, −1, 1, −1, 1, −1, 1, −1, 1, 1, 1, 1, −1, 1, −1, −1, |
| | 1, −1, −1, −1, 1, 1, −1, −1, 1, 1, 1, −1, 1, −1, |
| | 1, −1, −1, 1, 1, −1, −1, 1, 1, 1, 1, 1, −1, −1, 1, −1, −1, |
| | 1, −1, 1, −1, −1, −1, 1, −1, 1, 1, 1, −1, −1, 1, 1, −1, 1, 1, |
| | 1, −1, 1, 1, 1, 1, 1, 1, −1, 1, 1, −1, 1, 1, −1, −1, 1, −1, 1, |
| | 1, −1, −1, −1, −1, 1, −1, −1, −1, 1, 1, 1, |
| | 1, −1, −1, −1, −1, −1, −1, −1, 1, 1, |
| | 1, −1, −1, −1, 1, −1, −1, 1, 1, 1, −1, 1, −1, 1, 1, −1, |
| | 1, −1, −1, −1, −1, −1, 1 |

Such a PSS sequence may be a sequence having good auto-correlation and cross-correlation characteristics and still having excellent auto-correlation and cross-correlation characteristics even after differential decoding is applied.

The embodiments described above are combinations of elements and features of the present disclosure in a predetermined form. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious that claims that do not explicitly cite each other in the appended claims may be presented in combination as an exemplary embodiment of the present disclosure or included as a new claim by subsequent amendment after the application is filed.

The embodiment according to the present disclosure may be implemented by various means, for example, hardware, firmware, software, or a combination thereof. For implementation by hardware, an embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

In the case of implementations by firmware or software, an embodiment of the present disclosure may be implemented in the form of a module, procedure, or function for performing the aforementioned functions or operations. Software code may be stored in the memory and driven by the processor. The memory may be placed inside or outside the processor, and may exchange data with the processor through a variety of known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description and all changes coming within the meaning and equivalency range of the appended claims are intended to be embraced therein.

What is claimed is:

1. A method performed by a user equipment (UE), the method comprising:
receiving a downlink signal;
filtering the downlink signal;
sampling the filtered downlink signal;
performing differential decoding on the sampled downlink signal;
obtaining a primary synchronization signal (PSS) sequence based on the downlink signal on which the differential decoding is performed; and
obtaining cell area information based on the PSS sequence obtained based on the downlink signal on which the differential decoding is performed,
wherein the downlink signal is generated based on a discrete Fourier transform spread orthogonal frequency division multiplexing (DFT-s-OFDM) symbol.

2. The method of claim 1, wherein
the obtaining of the PSS sequence comprises:
generating a reference signal (RS); and
obtaining the PSS sequence based on correlation between the downlink signal on which the differential decoding is performed and the RS.

3. The method of claim 2, wherein
the generating of the RS comprises:
generating a PSS sequence at a time sample before a time sample at which the PSS sequence is generated;
performing discrete Fourier transform (DFT) on the generated PSS sequence;
mapping a resource to the PSS sequence on which the DFT is performed; and
performing inverse DFT (IDFT) on the resource to which the PSS sequence is mapped.

4. The method of claim 1, further comprising:
obtaining a PSS sequence based on the sampled downlink signal; and
obtaining cell area information based on the PSS sequence obtained based on the sampled downlink signal.

5. The method of claim 4, wherein
the obtaining of the PSS sequence based on the sampled downlink signal comprises:
generating an RS; and
obtaining the PSS sequence based on correlation between the downlink signal on which the differential decoding is performed and the RS.

6. The method of claim 5, wherein
the generating of the RS comprises:
generating a PSS sequence at a time sample before a time sample at which the PSS sequence is generated;
performing differential encoding on the generated PSS sequence;
performing DFT on the PSS sequence on the differential encoding is performed;
mapping a resource to the PSS sequence on which the DFT is performed; and
performing IDFT on the resource to which the PSS sequence is mapped.

7. A user equipment (UE) comprising:
at least one transceiver;
at least one processor configured to control the one or more transceivers; and
at least one memory including at least one instruction to be executed by the at least one processor,
wherein the at least one instruction comprises:
receiving a downlink signal;
filtering the downlink signal;
sampling the filtered downlink signal;
performing differential decoding on the sampled downlink signal;
obtaining a primary synchronization signal (PSS) sequence based on the downlink signal on which the differential decoding is performed; and
obtaining cell area information based on the PSS sequence obtained based on the downlink signal on which the differential decoding is performed,
wherein the downlink signal is generated based on a discrete Fourier transform spread orthogonal frequency division multiplexing (DFT-s-OFDM) symbol.

8. The UE of claim 7, wherein
the obtaining of the PSS sequence comprises:
generating a reference signal (RS); and
obtaining the PSS sequence based on correlation between the downlink signal on which the differential decoding is performed and the RS.

9. The UE of claim 8, wherein
the generating of the RS comprises:
generating a PSS sequence at a time sample before a time sample at which the PSS sequence is generated;
performing discrete Fourier transform (DFT) on the generated PSS sequence;
mapping a resource to the PSS sequence on which the DFT is performed; and
performing inverse DFT (IDFT) on the resource to which the PSS sequence is mapped.

10. The UE of claim 7, further comprising:
obtaining a PSS sequence based on the sampled downlink signal; and
obtaining cell area information based on the PSS sequence obtained based on the sampled downlink signal.

11. The UE of claim 10, wherein
the obtaining of the PSS sequence based on the sampled downlink signal comprises:
generating an RS; and
obtaining the PSS sequence based on correlation between the downlink signal on which the differential decoding is performed and the RS.

12. The UE of claim 11, wherein
the generating of the RS comprises:
generating a PSS sequence at a time sample before a time sample at which the PSS sequence is generated;

performing differential encoding on the generated PSS sequence;

performing DFT on the PSS sequence on the differential encoding is performed;

mapping a resource to the PSS sequence on which the DFT is performed; and performing IDFT on the resource to which the PSS sequence is mapped.

13. A method performed by a base station (BS), the method comprising:

generating a primary synchronization signal (PSS) sequence based on cell area information;

performing differential encoding on the PSS sequence;

performing discrete Fourier transform (DFT) on the PSS sequence on which the differential encoding is performed;

mapping a resource to the PSS sequence on which the DFT is performed;

generating a discrete Fourier transform spread orthogonal frequency division multiplexing (DFT-s-OFDM) symbol based on the resource to which the PSS sequence is mapped; and generating a downlink signal by adding a cyclic prefix (CP) to the DFT-s-OFDM symbol.

* * * * *